(12) United States Patent
Dudley et al.

(10) Patent No.: US 11,313,985 B2
(45) Date of Patent: Apr. 26, 2022

(54) SENSOR NODE ATTACHMENT MECHANISM AND CABLE RETRIEVAL SYSTEM

(71) Applicant: ION Geophysical Corporation, Houston, TX (US)

(72) Inventors: Timothy A. Dudley, Houston, TX (US); Darrell Burch, West Columbia, TX (US); Paul Brettwood, Sunderland (GB)

(73) Assignee: ION Geophysical Corporation, Houston, TX (US)

( * ) Notice: Subject to any disclaimer, the term of this patent is extended or adjusted under 35 U.S.C. 154(b) by 309 days.

(21) Appl. No.: 16/436,874

(22) Filed: Jun. 10, 2019

(65) Prior Publication Data

US 2019/0377097 A1    Dec. 12, 2019

Related U.S. Application Data

(60) Provisional application No. 62/682,728, filed on Jun. 8, 2018.

(51) Int. Cl.
*G01V 1/20* (2006.01)
*G01V 1/38* (2006.01)
*B65H 75/42* (2006.01)

(52) U.S. Cl.
CPC ........... *G01V 1/201* (2013.01); *B65H 75/425* (2013.01); *G01V 1/3835* (2013.01)

(58) Field of Classification Search
CPC ..... G01V 1/201; G01V 1/3843; B65H 75/425
See application file for complete search history.

(56) References Cited

U.S. PATENT DOCUMENTS

| | | | |
|---|---|---|---|
| 2,824,183 | A | 2/1958 | Marasco et al. |
| 2,981,454 | A | 4/1961 | Dickinson et al. |
| 3,093,333 | A | 6/1963 | Bishop |
| 4,055,138 | A | 10/1977 | Klein |
| 4,281,403 | A | 7/1981 | Siems et al. |

(Continued)

FOREIGN PATENT DOCUMENTS

| | | |
|---|---|---|
| CA | 2554788 C | 4/2016 |
| CA | 2581193 C | 4/2016 |

(Continued)

OTHER PUBLICATIONS

Authenticating Declaration of Ruben J. Rodrigues dated Aug. 10, 2018 in connection with IPR2018-00962, 4 pages.

(Continued)

*Primary Examiner* — Ian J Lobo
(74) *Attorney, Agent, or Firm* — Patterson & Sheridan, LLP

(57) ABSTRACT

An attachment system for releasably attaching a sensor node to a cable when in a coupled state includes a clamp base and a clamp grip. The clamp base is fixed to a surface of the sensor node. The clamp base further includes a latch that is biased in a latched position when the attachment system is in both the coupled state and an uncoupled state. The clamp grip is pivotably attached the clamp base and biased in an open position when the attachment system is in the uncoupled state. The clamp grip is secured to the clamp base by the latch when the attachment system is in the coupled state.

14 Claims, 16 Drawing Sheets

(56) References Cited

U.S. PATENT DOCUMENTS

| | | | |
|---|---|---|---|
| 4,292,861 | A | 10/1981 | Thornhill, Jr. et al. |
| 4,646,006 | A | 2/1987 | Schweitzer et al. |
| 4,666,338 | A | 5/1987 | Schoepf |
| 4,692,906 | A | 9/1987 | Neeley |
| 4,780,863 | A | 10/1988 | Schoepf |
| 5,189,642 | A | 2/1993 | Donoho et al. |
| 5,214,614 | A | 5/1993 | Baule |
| 5,214,768 | A | 5/1993 | Martin et al. |
| 5,253,223 | A | 10/1993 | Svenning et al. |
| 5,301,346 | A | 4/1994 | Notarianni et al. |
| 5,724,241 | A | 3/1998 | Wood et al. |
| 5,937,782 | A | 8/1999 | Rau |
| 6,024,344 | A | 2/2000 | Buckley et al. |
| 6,070,470 | A | 6/2000 | Harms et al. |
| 6,070,857 | A | 6/2000 | Dragsund et al. |
| 6,082,710 | A | 7/2000 | Dragsund et al. |
| 6,474,254 | B1 | 11/2002 | Ambs et al. |
| 6,607,050 | B2 | 8/2003 | He et al. |
| 6,657,921 | B1 | 12/2003 | Ambs |
| 6,932,185 | B2 | 8/2005 | Bary et al. |
| 6,934,219 | B2 | 8/2005 | Burkholder et al. |
| 6,951,138 | B1 | 10/2005 | Jones |
| 6,977,867 | B2 | 12/2005 | Chamberlain |
| 7,104,728 | B2 | 9/2006 | Luc et al. |
| 7,124,028 | B2 | 10/2006 | Ray et al. |
| 7,254,093 | B2 | 8/2007 | Ray et al. |
| 7,286,442 | B2 | 10/2007 | Ray et al. |
| 7,310,287 | B2 | 12/2007 | Ray et al. |
| 7,561,493 | B2 | 7/2009 | Ray et al. |
| 7,602,667 | B2 | 10/2009 | Thompson |
| 7,646,670 | B2 | 1/2010 | Maxwell et al. |
| 7,649,803 | B2 | 1/2010 | Ray et al. |
| 7,656,746 | B2 | 2/2010 | De et al. |
| 7,660,193 | B2 | 2/2010 | Goujon et al. |
| 7,668,047 | B2 | 2/2010 | Ray et al. |
| 7,804,737 | B2 | 9/2010 | Thompson |
| 7,724,607 | B2 | 10/2010 | Ray et al. |
| 7,883,292 | B2 | 2/2011 | Thompson et al. |
| 7,983,847 | B2 | 7/2011 | Ray et al. |
| 7,986,589 | B2 | 7/2011 | Ray et al. |
| 7,990,803 | B2 | 8/2011 | Ray et al. |
| 8,050,140 | B2 | 11/2011 | Ray et al. |
| 8,087,848 | B2 | 1/2012 | Thompson et al. |
| 8,172,480 | B2 | 5/2012 | Thompson et al. |
| 8,228,761 | B2 | 7/2012 | Ray et al. |
| 8,296,068 | B2 | 10/2012 | Ray et al. |
| 8,328,467 | B2 | 12/2012 | Thompson et al. |
| 8,644,111 | B2 | 2/2014 | Ray et al. |
| 8,801,328 | B2 | 8/2014 | Thomspon et al. |
| 8,879,362 | B2 | 11/2014 | Ray et al. |
| RE45,268 | E | 12/2014 | Ray et al. |
| 9,448,311 | B2 | 9/2016 | Maxwell |
| 9,475,552 | B2 | 10/2016 | Thompson et al. |
| 9,523,780 | B2 | 12/2016 | Naes et al. |
| 9,541,663 | B2* | 1/2017 | Rokkan ............... F16L 1/20 |
| 9,829,589 | B2 | 11/2017 | Ray et al. |
| 9,829,594 | B2 | 11/2017 | Ray et al. |
| 10,288,750 | B2* | 5/2019 | Hovland ............ G01V 1/3852 |
| 2005/0105391 | A1 | 5/2005 | Berg |
| 2005/0246137 | A1 | 11/2005 | Brinkman et al. |
| 2006/0201243 | A1 | 9/2006 | Auffret et al. |
| 2007/0044970 | A1 | 3/2007 | Streater et al. |
| 2008/0106977 | A1 | 5/2008 | Ray et al. |
| 2008/0181055 | A1 | 7/2008 | Ray et al. |
| 2009/0016157 | A1 | 1/2009 | Ray et al. |
| 2009/0092005 | A1 | 4/2009 | Goujon et al. |
| 2010/0054078 | A1 | 3/2010 | Thompson et al. |
| 2011/0051550 | A1* | 3/2011 | Lindberg ............ G01V 1/247 367/20 |
| 2013/0058192 | A1 | 3/2013 | Gateman et al. |
| 2015/0362606 | A1 | 12/2015 | Henman et al. |
| 2017/0082763 | A1 | 3/2017 | Rokkan et al. |
| 2017/0254913 | A1 | 9/2017 | Ray et al. |
| 2017/0261627 | A1 | 9/2017 | Ray et al. |
| 2017/0261628 | A1 | 9/2017 | Ray et al. |
| 2018/0106921 | A1* | 4/2018 | Rokkan ............... G01V 1/202 |
| 2018/0341033 | A1 | 11/2018 | Olivier et al. |
| 2018/0341035 | A1 | 11/2018 | Swinford et al. |

FOREIGN PATENT DOCUMENTS

| | | | |
|---|---|---|---|
| CA | 2976329 A1 * | 8/2016 | ........... G01V 1/3852 |
| CN | 101825721 B | 2/2012 | |
| CN | 101057160 B | 9/2012 | |
| CN | 106249280 A | 12/2016 | |
| EP | 1716435 A2 | 11/2006 | |
| EP | 1805533 A1 | 7/2007 | |
| GB | 2275337 A | 8/1994 | |
| GB | 2395273 A | 5/2004 | |
| MX | PA06008582 A | 8/2007 | |
| MX | 2007003290 A | 10/2008 | |
| RU | 2352960 C2 | 4/2009 | |
| RU | 2416810 C2 | 4/2011 | |
| WO | 03096072 A1 | 11/2003 | |
| WO | 2004031807 A1 | 4/2004 | |
| WO | 2004046682 A2 | 6/2004 | |
| WO | 2005074426 A2 | 8/2005 | |
| WO | 2005119299 A1 | 12/2005 | |
| WO | 2006041438 A1 | 4/2006 | |
| WO | 2010025283 A2 | 3/2010 | |
| WO | 2011139159 A1 | 11/2011 | |
| WO | 2017007879 A1 | 1/2017 | |
| WO | 2019237127 A2 | 12/2019 | |

OTHER PUBLICATIONS

File wrapper of U.S. Appl. No. 10/448,547 as of Oct. 26, 2012, 501 pages.

International Search Report and Written Opinion dated Oct. 29, 2018 in connection with International Patent Application No. PCT/US2018/034406, 18 pages.

International Search Report and Written Opinion dated Sep. 3, 2018 in connection with International Patent Application No. PCT/US2018/034104, 12 pages.

Invitation to Pay Additional Fees, and, Where Applicable, Protest Fee dated Sep. 6, 2018 in connection with International Patent Application No. PCT/US2018/034406, 12 pages.

Magseis FF LLC's Patent Owner Response Pursuant to 37 C.F.R. § 42.120(a) dated Feb. 8, 2019 in connection with IPR2018-00962, 74 pages.

Patent Owner Preliminary Response filed Aug. 10, 2018 in connection with IPR2018-00962, 71 pages.

Photograph of the ZXPLR node, 1 page, in connection with IPR2018-00961.

Photograph of Z3000 node in connection with IPR2018-00961, 1 page.

Results from Google Scholar search on Schmalfeldt, 2 pages.

Transcript of Jun. 4, 2019 deposition of Gerard Beaudoin in connection with IPR2018-00960, IPR2018-00961, and IPR2018-00962, 30 pages.

Z3000 Chart filed as exhibit 2048 in IPR2018-00962, 28 pages.

Z3000 Chart in connection with IPR2018-00961, 29 pages.

Z700 Chart filed as exhibit 2049 in connection with IPR2018-00962, 27 pages.

Z700 Chart, exhibit 2033 in IPR2018-00961, 29 pages.

Z700 Chart, exhibit 2033 in IPR2018-00962, 27 pages.

ZXPLR Chart, Exhibit 2034 in IPR2018-00961, 30 pages.

ZXPLR specification sheet, 2018, 1 page.

Makris, J. et al. "WARRP (Wide Aperture Reflection and Refraction Profiling): The principle of successful data acquisition where conventional seismic fails." SEG Technical Program Expanded Abstracts, Jan. 1999, 5 pages.

"WARRP Offfshore," GeoPro GmbH, Hamburg, Germany, 2002, 2 pages.

Sheriff, "Encyclopedic Dictionary of Applied Geophysics," Fourth Edition, 13 Geophysical References Series. 2002, 3 pages.

Shao, A. et al. "An ocean bottom seismic data recorder." Chinese Journal of Physics, vol. 46, No. 2, 2003, pp. 311-317.

(56) References Cited

OTHER PUBLICATIONS

Forland, W. "Posisjonsbestemmelse VED avbunnsseismikk (10m-2000m)", Geodesi—OG Hydrografidagene 2004, Multiwave Geophysical Company ASA, 25 pages.
"A Seismic Shift in OBN Efficiency," Manta, Seabed Geosolutions, revised Dec. 2016, 1 page.
Deposition Transcripts of Gerard Beaudoin dated Jan. 21, 2019 in connection with IPR2018-00960, IPR2018-00961, and IPR2018-00962, 147 pages.
Declaration of Carol Elizabeth Jacobson regarding public availability of defense technical information center records dated Nov. 1, 2018, 3 pages.
Transcripts of Apr. 12, 2019 deposition of Rocco Detomo in connection with IPR2018-00960, IPR2018-00961, and IPR2018-00962, 25 pages.
Institution of Inter Partes Review Decision entered Nov. 29, 2018 in IPR2018-00960, 30 pages.
Inter Partes Review Decision entered Nov. 8, 2018 in IPR2018-00961, 53 pages.
Inter Partes Review Decision entered Nov. 8, 2018 in IPR2018-00962, 39 pages.
Fairfield Industries Wins 2006 Helios "Partnership" Award, Business Wire, Dec. 18, 2006, 1 page.
First Amended Complaint filed Dec. 18, 2017 in connection with Inter Partes Review Case No. 4:17-cv-01458, 105 pages.
Feb. 17, 1984 Government Reports Announcements & Index (Michigan State University Libraries), 150 pages.
Government Reports, Announcements & Index, U.S. Department of Commerce National Technical Information Service, vol. 84, No. 4, Feb. 17, 1984, 11 pages.
Patent Owner Response dated Feb. 19, 2019 in connection with IPR2018-00960, 74 pages.
Declaration of Laurie Stewart dated Feb. 5, 2019 in connection with IPR2018-00961, 6 pages.
Declaration of Laurie Stewart dated Feb. 5, 2019 in connection with IPR2018-00962, 6 pages.
Declaration of Dr. Rocco Detomo dated Feb. 6, 2019 in connection with IPR2018-00960, 86 pages.
Declaration of Dr. Rocco Detomo dated Feb. 6, 2019 in connection with IPR2018-00961, 104 pages.
Declaration of Dr. Rocco Detomo dated Feb. 6, 2019 in connection with IPR2018-00962, 93 pages.
Declaration of Michael Morris dated Feb. 6, 2019 in connection with IPR2018-00961, 3 pages.
Declaration of Michael Morris dated Feb. 6, 2019 in connection with IPR2018-00962.
Authenticating Declaration of Sarah E. Rieger dated Feb. 8, 2019 in connection with IPR2018-00961, 3 pages.
Magseis FF LLC's Patent Owner Response Pursuant to 37 C.F.R. § 42.120(a) dated Feb. 8, 2019 in connection with IPR2018-00961, 80 pages.
Memorandum and Order dated Mar. 10, 2015 in connection with Civil Action No. 4:14-CV-2972, 37 pages.
Transcriptions of Apr. 11, 2019 Deposition of Dr. Rocco Detomo in connection with IPR2018-00960, IPR2018-00961, and IPR2018-0062, 71 pages.
Transcript of Apr. 15, 2019 Deposition of Laurie A. Stewart in connection with IPR2018-00961, IPR2018-00961, and IPR2018-00962, 18 pages.
Openshaw, "The Atlantis OBS Project: Managing the OBS Node Development Evolution," Offshore Technology Conference, May 1, 2006. 10 pages.
"A Seismic Shift in OBN Efficiency," Manta, Seabed Geosolutions, revised May 2017, 1 page.
Motion to Stay Pending Inter Partes Reviews of the Patents-In-Suit filed May 1, 2018 in Inter Partes Review Case No. 4:17-cv-01458, 15 pages.
Complaint filed May 11, 2017 in connection with Inter Partes Review Case No. 17-cv-01458, 27 pages.

Petitioner's Reply to Patent Owner's Response dated May 8, 2019 in connection with IPR2018-00960, 34 pages.
Petitioner's Reply to Patent Owner's Response dated May 8, 2019 in connection with IPR2018-00961, 35 pages.
Petitioner's Reply to Patent Owner's Response dated May 8, 2019 in connection with IPR2018-00962, 35 pages.
Supplemental Declaration of Gerard J. Beaudoin dated May 8, 2019 in connection with IPR2018-00960, 7 pages.
Supplemental Declaration of Gerard J. Beaudoin dated May 8, 2019 in connection with IPR2018-00961, 11 pages.
Supplemental Declaration of Gerard J. Beaudoin dated May 8, 2019 in connection with IPR2018-00962, 11 pages.
Magseis FF LLC's Sur-Reply to Petitioner's Reply to Patent Owner's Response dated Jun. 10, 2019 in connection with IPR2018-00960, 29 pages.
Magseis FF LLC's Sur-Reply to Petitioner's Reply to Patent Owner's Response dated Jun. 10, 2019 in connection with IPR2018-00961, 36 pages.
Magseis FF LLC's Sur-Reply to Petitioner's Reply to Patent Owner's Response dated Jun. 10, 2019 in connection with IPR2018-00962, 34 pages.
Schmalfeldt, et al. "Explosion-Generated Seismic Interface Waves in Shallow Water: Experimental Results." Saclantcen Report SR-71, Jul. 1, 1983. 40 pages.
2010 Specification Sheet for the Z3000 node, in connection with IPR2018-00961, Aug. 2010, 1 page.
Authenticating Declaration of Ruben J. Rodrigues dated Aug. 10, 2018 in connection with IPR2018-00961, 4 pages.
Patent Owner Preliminary Response filed Aug. 10, 2018 in connection with IPR2018-00961, 75 pages.
"Seismic Acquisition," Schlumberger Oilfield Glossary, obtained Sep. 2, 2014 from <http://www.glossary.oilfield.slb.com/enTerms/s/seismic_acquisition.aspx.>, 1 page.
Memorandum and Order dated Sep. 25, 2018 in Civil Action No. H-17-1458, 9 pages.
Z700 node specification sheet, Sep. 9, 2009, 1 page.
Beaudoin et al. "Field design and operation of a novel deepwater, wide-azimuth node seismic survey." The Leading Edge, Apr. 2007, 8 pages.
Bommer et al. "Control of Hazard Due to Seismicity Induced by a Hot Fractured Rock Geothermal Project," Engineering Geology, vol. 83, No. 4, 2006, 31 pages.
Buttgenbach et al. "Self-landing and ascending OBS: opportunity for commercial seismics in the ultra deep sea." First Break, vol. 20, Dec. 12, 2002, 12 pages.
Carstens, "Grabbing a Larger Share of the Market," Geo ExPro, vol. 7, No. 6, Dec. 2010, 6 pages.
Dellinger et al. "The "Green Canyon" event as recorded by the Atlantis OBS node survey." 4 pages.
Durham, "Nodal Seismic's Light Footprint a Big Plus," AAPG Explorer, Oct. 10, 2010, 3 pages.
Fisher, "Seismic Survey Probes Urban Earthquake Hazards in Pacific Northwest," EOS, vol. 80, No. 2, Jan. 12, 1999, 6 pages.
Grevemeyer et al. "Crustal architecture and deep structure of the Ninetyeast Ridge hotspot trail from active-source ocean bottom seismology." Geophys. J. Int., 2001, 144, 18 pages.
Hassan, et al. The Influence of Sediment Layering and Geoacoustics on the Propagation of Scholte Interface Waves, 1993, IEEE, I-105-I-113, 9 pages.
Hatchell et al. "Ocean Bottom Seismic (OBS) timing drift correction using passive seismic data." 2010, 5 pages.
Hino et al. "Micro-tsunami from a local interplate earthquake detected by cabled offshore tsunami observation in northeastern Japan," Geophysical Research Letters, vol. 28, No. 18, Sep. 15, 2001, 4 pages.
Hyne, Norman. "Nontechnical Guide to Petroleum Geology, Exploration, Drilling, and Production," 2nd Edition, 2011, 29 pages.
Hyne, "Dictionary of Petroleum Exploration, Drilling & Production: Definition of Seismic Exploration" Second Edition, 2014, 4 pages.
Hyne, "Dictionary of Petroleum Exploration, Drilling & Production: Definition of Seismic" Second Edition, 2014, 4 pages.

(56) References Cited

OTHER PUBLICATIONS

Klingelhofer et al. "Crustal structure of the NE Rockall Trough from wide-angle seismic data modeling." Journal of Geophysical Research, vol. 110, B11105, Nov. 29, 2005, 25 pages.

Marsella et al. "The Stromboli geophysical experiment. Preliminary report on wide angle refraction seismics and morphobathymetry of Stromboli island (southern Tyrrhenian Sea, Italy) based on integrated offshore-onshore data acquisition." 2007, 84 pgs.

Mienert, "Cruise Report Barents-Sea Continental Martin Hermes-Project 3D-Fluid Flow of HMMV," Jul. 17, 2005, 53 pages.

Moldoveanu, "Recent and future developments in marine acquisition technology; an unbiased opinion." Recorder, vol. 31, Mar. 2006.

Prevedel et al. "Downhole Geophysical Observatories: Best Installation Practices and a Case History from Turkey," Int. J. Earth Sci. Feb. 7, 2015, 11 pages.

Ross, Carl. "Pressure Vessels, External Pressure Technology." 2001, 16 pages.

Ross et al. "Field design and operation of a deep water, wide azimuth node seismic survey." SEG New Orleans 2006 Annual Meeting, 6 pages.

Schmalfeldt, et al. "Explosion-Generated Seismic Interface Waves in Shallow Water: Experimental Results," Saclant ASW Research Centre Report. Jul. 1, 1983, 67 pages.

Sheriff, "Encyclopedic Dictionary of Applied Geophysics," Fourth Edition, 13 Geophysical References Series. 2002, 5 pages.

Vuillermoz, et al. "Full Azimuth 4C Node Acquisition for Enhanced PP and PS imaging." 7th International Conference & Expo on Petroleum Geophysics, 2008.

International Search Report and Written Opinion issued for International Application No. PCT/US2019/036424 dated Dec. 3, 2019, 18 pages.

Invitation to pay additional fees and partial search report issued for International Application No. PCT/US2019/036424 dated Oct. 9, 2019, 16 pages.

* cited by examiner

SENSOR NODE ATTACHMENT MECHANISM AND CABLE RETRIEVAL SYSTEM

CROSS-REFERENCE TO RELATED APPLICATIONS

This application claims priority to U.S. Provisional Patent Application No. 62/682,728, entitled "Sensor node attachment mechanism and cable retrieval system" filed 8 Jun. 2018, which is incorporated by reference herein, in the entirety and for all purposes.

BACKGROUND

This application relates generally to seismic surveys and sensor arrangements for gathering seismic data. More specifically, the application relates to improved deployment and recovery technologies for seismic receivers and other types of sensors or nodes. Marine seismic exploration is traditionally conducted by firing acoustic sources, which generate collapsing air bubbles in the water column. The collapse of the bubbles generates acoustic pulses, which propagate through the water and are transmitted to the earth's crust in the form of seismic waves. Some of the seismic waves reflect from subsurface structures, and the resulting signals can be detected by an array of seismic receivers disposed on the seafloor or towed behind a seismic vessel.

The reflected wavefield can be analyzed to generate geophysical data and images indicating the composition of the Earth near the survey location. Within the water column itself, the seismic wavefield can be transmitted in the form of pressure waves (P-waves), while both P-waves and impact-resultant shear waves (S-waves) can propagate through the earth to be observed on the ocean bottom, in addition to other, more complex wavefield components.

In traditional towed marine seismic exploration, an array of seismic sensors or receivers is towed near the sea surface behind a marine vessel. The receivers typically include pressure sensors or hydrophones, which are mounted to sensor cables commonly referred to as streamers. The streamers serve as platforms or carriers for the seismic sensors, which are distributed along the length of each streamer cable in the array.

Rope and cable-based seismic systems can also be used to deploy ocean bottom sensor nodes, typically including both hydrophones and particle motion sensors such as geophones or accelerometers. Power and telemetry can be supplied via electrical and optical conductors provided along the rope or cable, for example, with the sensor nodes or stations distributed at periodic intervals of 25 to 50 meters. Alternatively, a passive cable configuration can be used, wherein the nodes are powered by internal batteries during deployment and the spacing along the cable can be uniform or varied.

A set of seismic sources can also be towed near the sea surface and operated to periodically emit acoustic energy. The acoustic energy propagates downward through the seawater (or other water column), penetrates the ocean floor and reflects from the subsea strata (and other underlying structures). The reflected portion of the seismic energy returns upward to the ocean bottom nodes or through the water column to the receivers distributed along the streamer cables, or both. The sensors generate data records characterizing the upward-traveling component of the acoustic wavelets (or seismic waves). The seismic data recorded at each receiver or node point can then be gathered together and processed in order to generate seismic images of the underlying structures.

In both towed and ocean-bottom seismic exploration, the receivers and nodes are typically attached to a rope or cable before deployment, and then removed after data acquisition and retrieval. The attachment and removal processes can be time consuming and improper coupling procedures can lead to equipment losses. As a result, there is a continuous demand for improved techniques to securely couple seismic nodes and receivers to a rope or cable, while providing for safer, faster, and more efficient sensor deployment and retrieval.

The information included in this Background section of the specification, including any references cited herein and any description or discussion thereof, is included for technical reference purposes only and is not to be regarded subject matter by which the scope of the invention as defined in the claims is to be bound.

SUMMARY

In one implementation, an attachment system for releasably attaching a sensor node to a cable is disclosed. The attachment system includes a clamp base and a clamp grip. The clamp base is fixed to a surface of the sensor node. The clamp base further includes a latch that is biased in a latched position when the attachment system is in both the coupled state and an uncoupled state. The clamp grip is pivotably attached the clamp base and biased in an open position when the attachment system is in the uncoupled state. The clamp grip is secured to the clamp base by the latch when the attachment system is in the coupled state. A channel may further be disposed between the clamp base and the clamp grip within which the cable is positioned when the attachment system is attached to the cable. A first portion of the channel may be defined within the clamp grip and a second portion of the channel may be defined within the clamp base. A plurality of raised ribs may extend from a surface of the first portion of the channel, a surface of the second portion of the channel, or both.

In some embodiments, the clamp base may further include a first set of hinge knuckles formed thereon. The clamp grip may further include a second set of hinge knuckles formed thereon and configured to pivotably interface with the first set of hinge knuckles. A hinge pin may be positioned between and within the first and second sets of hinge knuckles to form a hinged attachment between the clamp base and the clamp grip. The clamp grip may further include a plurality of latch fingers which are secured to the clamp base by the latch when the attachment system is in the coupled state. In some embodiments, the latch further comprises a latch pin with a plurality of latch plates separated by a plurality of keyways. The latch fingers may be configured to fit within the keyways when the latch is forced into an open position by a first external force and further when the clamp grip is forced into a closed position by a second external force when the attachment system is in the uncoupled state. The latch fingers may be retained within the latch by the latch plates to maintain the clamp grip in the closed position when the first and second external forces are removed such that the latch returns to the latched position.

In another implementation, a seismic sensor node apparatus includes a cable and a plurality of seismic sensor nodes with coupling mechanisms releasably coupled thereto. The cable may be configured for deployment into a seismic medium. Each sensor node includes a seismic sensor and a coupling mechanism. The seismic sensor is disposed within a housing and is configured to generate signals responsive to seismic energy propagating in the seismic medium. The coupling mechanism is fixed to an exterior of the housing for removably coupling the housing to the cable. The coupling mechanism includes a clamp configured to grip the cable in a coupled state and biased in an open position in an uncoupled state and a clamp latch biased in a latched position in both the coupled state and in the uncoupled state.

In another implementation, a cable retrieval system for paying out or retrieving a length of a cable with sensor nodes attached thereto is disclosed. The cable retrieval system includes an overboarding unit, a position sensing device, and a control system. The cable travels through the overboarding unit during payout or retrieval from deployment. The position sensing device is positioned with respect to the overboarding unit such that a field of view of the position sensing device includes a path of the cable either forward or aft, or both, of the overboarding unit before sections of the cable reach the overboarding unit. The control system connected to the position sensing device and to the overboarding unit. The control system is configured to receive position information from the position sensing device of one of the sensor nodes attached to the cable when the one of the sensor nodes is within the field of view. The control system is also configured to process the position information to time control signals to operate the overboarding unit such that the one of the sensor nodes avoids contact with structures on the overboarding unit as the cable passes through the overboarding unit.

In some embodiments, the overboarding unit may further include a rotating frame, a plurality of rotating sheaves mounted on the rotating frame at spaced apart positions, and a locking system under control of the control system configured to arrest rotation of the rotating frame. The control system may be configured to engage the locking system and prevent rotation of the rotating frame when the position sensing device does not detect one of the sensor nodes within the field of view. The control system may further be configured to disengage the locking system to allow rotation of the rotating frame when the position sensing device detects one of the sensor nodes within the field of view and the sensor node reaches a threshold position.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. A more extensive presentation of features, details, utilities, and advantages of the present invention as defined in the claims is provided in the following written description of various embodiments and implementations and illustrated in the accompanying drawings.

DETAILED DESCRIPTION

In the following, reference is made to embodiments of the invention. It should be understood, however, that the invention is not limited to the specifically described embodiments. Any combination of the following features and elements, as described in terms of the various embodiments, is contemplated to implement and practice the invention.

Although various features of the invention may provide advantages over the prior art, and over other possible solutions to the problems address herein, whether or not such advantages are achieved does not limit the invention to a given embodiment. The following aspects, features, and advantages of the invention are merely illustrative and are not considered elements or limitations of the appended claims, except where explicitly recited therein. Likewise, reference to "the invention" shall not be construed as a generalization of any subject matter disclosed herein and does not limit the claims except where expressly included.

Figure 1:
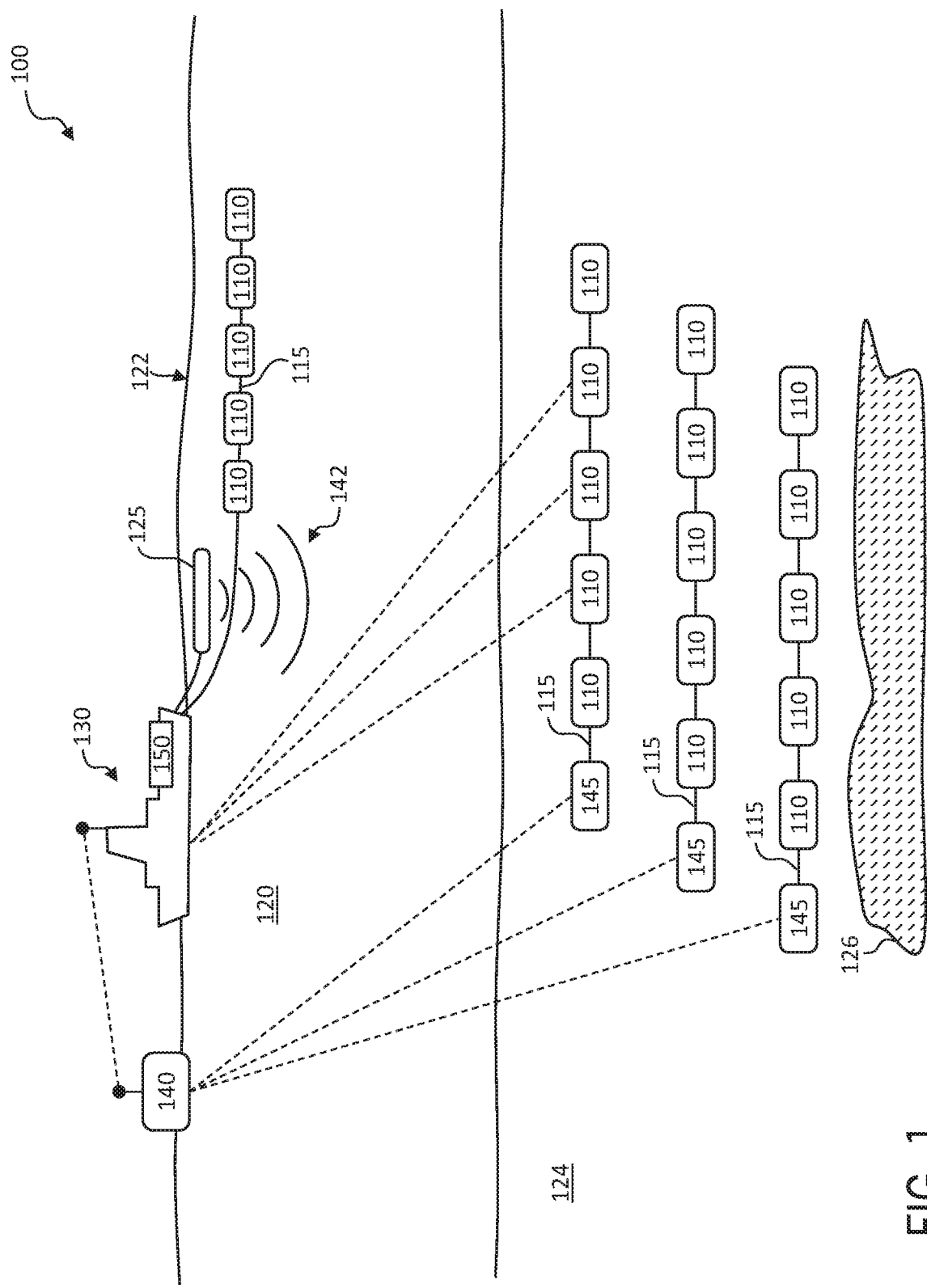
FIG. 1 is a schematic illustration of an exemplary seismic survey system configured for acquiring seismic data.

FIG. 1 illustrates a representative seismic survey (or survey system) 100, with an array of seismic receivers or autonomous nodes 110 deployed to a water column 120 along one or more ropes or cables 115. Sensor nodes 110 may include, but are not limited to, seismic nodes, receivers, or other autonomous sensing devices, positioning equipment, temperature and salinity measurement equipment, depth indicating equipment, or, alternatively, acoustic pingers or other transponders for location identification or other information transmission, for deployment along a cable to a water column or other seismic medium. Nodes 110 can be suspended at a depth within a water column between the top surface and the ocean floor or seabed, towed behind a vessel, or deployed upon the ocean bottom. In some configurations, a combination of ocean-bottom cables, towed cables, and and/or suspended nodes can be deployed. In this disclosure the term "cable" refers to rope, cable, or wire or other stress member to which nodes 110 may be attached. The water column 120 extends from a top surface 122 to the ocean floor or other bottom surface 124 above a petroleum reservoir or other subsurface structure 126 of interest to the seismic survey.

Depending on the application, cables 115 can be towed through the water column 120 behind one or more seismic vessels 130 using a suitably adapted seismic survey deployment system 150. Suitable seismic vessels 130 can also be configured to deploy nodes 110 to the seabed or other bottom surface 124, e.g., with nodes 110 distributed along individual cables 115 above a reservoir or other subsurface structure 126, shown in FIG. 1. Nodes 110 can be seismic nodes, receivers, or other autonomous sensing devices, or, alternatively or in addition, acoustic pingers or other transponders for location identification or other information transmission attached along the cable 115. Nodes 110 can also be suspended at depth within water column 120, between top surface 122 and the ocean floor or seabed 124, or a combination of ocean-bottom cables 115, towed nodes 110 and suspended nodes 110 can be deployed.

While references may be made to a sea floor or seabed with respect to this particular example, node deployment pursuant to this disclosure is not necessarily limited to any particular body of water or other seismic medium 120. Rather, nodes 110 may be deployed to any body of water, marine, land-based, or other seismic environment 120, including oceans, lakes, rivers, etc. Accordingly, the use of the terms sea, seabed, sea floor, and the like should be broadly understood to encompass all bodies of water 120 and all marine or land-based surfaces 124 suitable for node deployment to detect propagating seismic energy or other signal or energy recordable by any type of sensor packaged as a node.

In some embodiments, individual cables 115 can be made from a synthetic or metallic material with a predefined specific density relative to the water column 120 in which cables 115 are immersed. In some embodiments, individual cables 115 may have a passive cable configuration, e.g., without internal electrical conductors or other hard-wired signal elements. In other embodiments, the cables 115 may include embedded conductors for communicating one or more of a clock signal, data signals, control signals and power among individual seismic nodes or receivers 110. Thus, each cable 130 may have a passive configuration, absent signal or power connections between the individual receivers or nodes 110 distributed along each cable 115, or an active configuration, in which signal and/or power connections are provided between the receivers or nodes 110.

In particular embodiments, nodes 110 can be deployed via an autonomous or remotely operated seismic vessel 130 operating either on the surface 122 or at a selected depth within the water column 120, or on the bottom surface 124. In other examples, one or mode nodes 110 may be equipped with steering, propulsion and/or recovery systems adapted to navigate nodes 110 through the water column 120 while disposed along cables 115, or to recover nodes 110 and cables 115 from water column 120.

Seismic nodes 110 can also be configured for external communications while deployed in water column 120, for example via a termination device or transponder 145 deployed along cable 115, with either a wired or wireless (e.g., acoustic, inductive or capacitive) data connection to a seismic hub or buoy system 140. Wireless data communications can also be provided directly between individual nodes 120 and a seismic vessel 130, and between seismic vessel 130 and one or more hub devices 140.

Suitable hub devices 140 can be equipped with a global positioning satellite (GPS) system or other positioning or navigational system to determine location and timing data for nodes 110. A suitably configured hub 140 or "master" node station 145 can also be provided with a high precision master clock to synchronize timing information for the seismic nodes 110 disposed along each respective cable 115.

Suitable hubs 140 or master node stations 145 can also be equipped with power generation, energy storage and control logic devices for performing quality checks on seismic data collected by the individual receivers of nodes 110, and operating commands selected to perform quality and station health tests, to communicate a prioritized subset of the seismic data, to turn individual nodes 110 on or off, or to enter a power saving mode.

In operation of the seismic survey 100, one or more seismic vessels 130 can be configured to a tow a seismic source 125 (or source array) 125, either alone or in combination with an array of seismic receivers or nodes 110 disposed along one or more towed cables, streamers or node lines 115. Alternatively or in combination, nodes 110 can also be deployed in an array of one or more ocean bottom cables 115, e.g., as disposed on the bottom surface 124 of water column 120, or at a selected depth below top surface 122 and above bottom surface 124. Seismic cables 115 thus encompass a variety of towed streamer, ocean bottom cable, and suspended cable embodiments, and marine-based seismic system configurations.

Similarly, a plurality of source boats or other seismic vessels 130 may be employed, and cables 115 can be arranged in a combination of towed, ocean bottom, and suspended seismic arrays depending on the desired configuration of seismic survey system 100. In multiple vessel embodiments, a number of towed sources 125 can be configured to operate independently or to emit seismic energy 142 in a coordinated fashion at substantially the same time, e.g., according to a simultaneous source regime.

Depending on embodiment, each source apparatus 125 may include one or more seismic source components configured to generate seismic energy, in the form of acoustic waves 142 propagating through water column 120. For example, an air gun array or subarray 125 can be configured to generate acoustic waves 142 by emitting controlled blasts of compressed air, or other pneumatic, mechanical, or electromechanical source components 125 can be used.

A portion of the seismic waves 142 propagating down through water column 120 will penetrate the ocean floor 124, and reflect from petroleum reservoir or other subsurface geological structure 126. A portion of the reflected seismic energy can propagate back up through ocean bottom 124 to seismic nodes 110 deployed along one or more ocean bottom cables 115, and back up through water column 120 to receivers or nodes 110 disposed along one or more cables 115 towed by a seismic vessel 130 or suspended at depth in water column 120.

Reflections also occur at both top surface 122 and bottom surface 124, resulting in a complex combination of upward-propagating and downward-going seismic wavefield components. Deghosting and other advanced processing techniques are thus applied to the resulting seismic data acquired by nodes 110, in order to generate images of the subsurface layers and other relevant geological structures. The images can be analyzed by geologists, engineers, and other industry users to identify relevant features of subsurface reservoirs 126 and other geological structures likely to include hydrocarbons or other natural resources, and to locate and characterize other subsurface geology of interest.

In many situations, it may be preferable to attach the seismic nodes 110 to the cable 115 when the receiver sensor array is deployed and detach the nodes 110 from the cable 115 when the receiver sensor array is retrieved. Doing so provides a number of advantages. First, the cable 115 can easily be coiled on spools once the nodes 110 are removed. If the nodes 110 were permanently attached to the cable 115, it would be difficult to store the cable 115 without damaging the nodes 110. Further, it would be difficult to pass the cable 115 with attached nodes 110 through directional and drive pulleys necessary to deploy the cable 115 into and retrieve the cable 115 from the water column 120. Additionally, it is significantly easier to clean, service, recharge, and download data from the nodes 110 if they are detached from the cable 115. For example, once detached, the nodes 110 can be placed into charging and data download stations. Such would be extremely difficult to do if the nodes 110 remain attached to the cable 15.

FIGS. 2-7 depict an attachment mechanism 200 for attaching a sensor node 210 to a deployment cable 214 in the context of a deployment system on the stern deck of a marine seismic vessel. Suitable examples of sensor nodes are described in U.S. patent application Ser. No. 15/988,668 entitled MODULAR SEISMIC NODE filed 24 May 2018, which is incorporated by reference herein in its entirety and for all purposes. Suitable deployment systems are described in U.S. patent application Ser. No. 15/987,241 entitled SEISMIC NODE DEPLOYMENT SYSTEM filed 23 May 2018 and U.S. Patent Application Publication No. US 2013/0189036, each of which is incorporated by reference herein in its entirety and for all purposes.

Depending on embodiment, suitable sensor modules or nodes may include at least one seismic sensor configured to generate seismic data responsive to seismic waves or wavefield and a clock configured for associating the seismic data with a clock signal or other timing signal. In some embodiments, nodes may be modular and composed of two or more separable components attached together, for example, a power source module and a sensor module. In some configurations, nodes may comprise a coupling mechanism configured to mechanically engage the power source module with the sensor module and to mechanically disengage the power source module from the sensor module. Suitable power modules may include at least one power source and a memory with capacity for storing the seismic data and associated clock signal. In some embodiments, the sensor module includes an elongate lobe or axial section extending from a base or frame component with the at least one seismic sensor. In addition to a seismic motion sensor and an acoustic pressure sensor, the modular seismic node may also include a number of additional geophones, hydrophones, accelerometers, velocity sensors, and the like.

Figure 2:
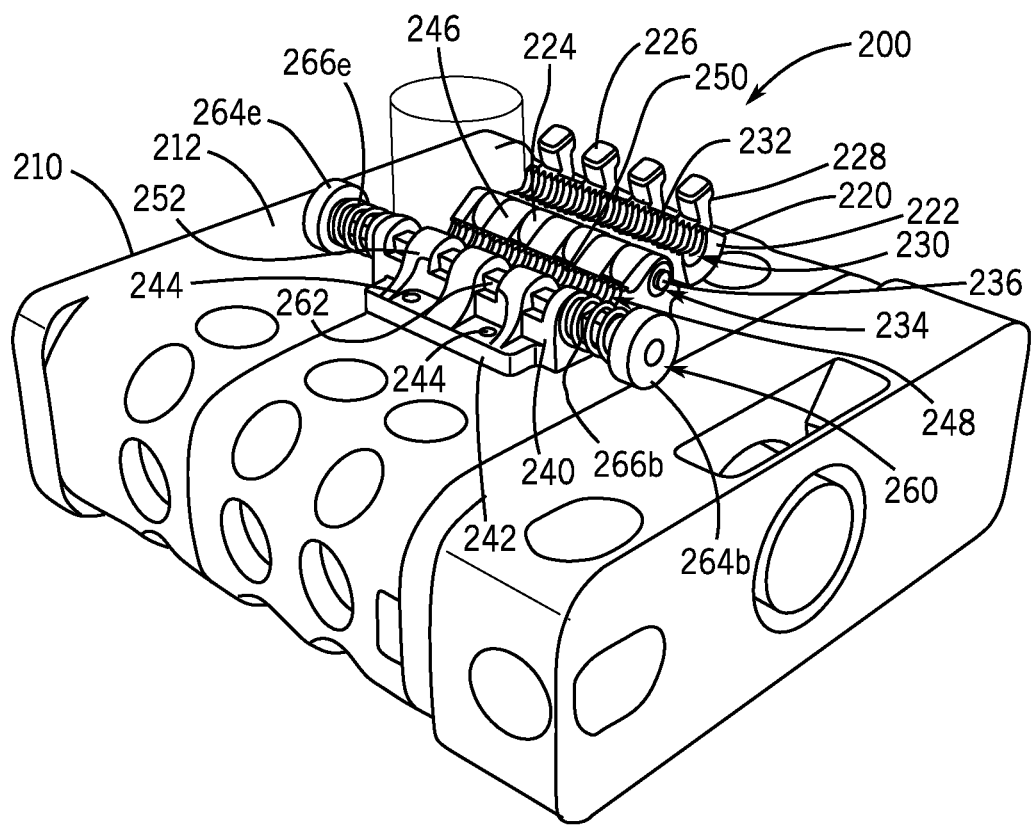
FIG. 2 is a top, front, right isometric view of a sensor node with an attachment mechanism in an open position for clamping the node to a cable.
Figure 3:
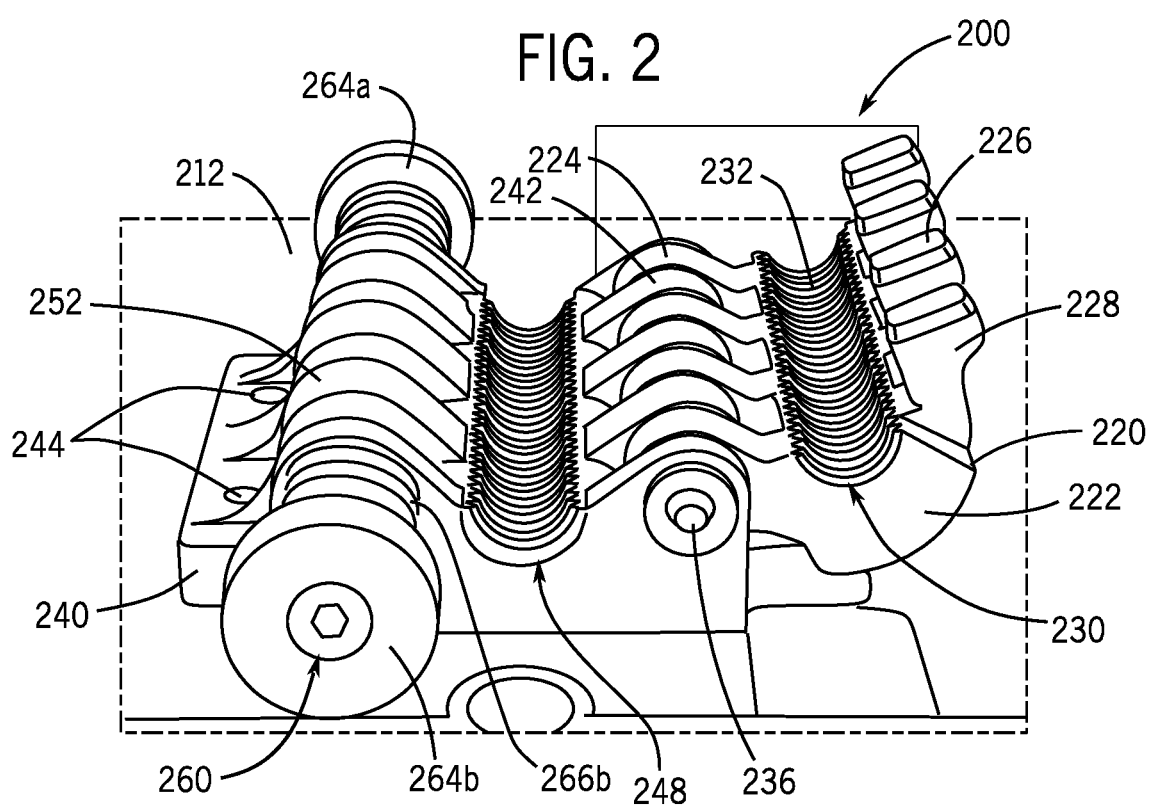
FIG. 3 is a right side isometric view of the attachment mechanism of FIG. 2 in an open position.
Figure 4:
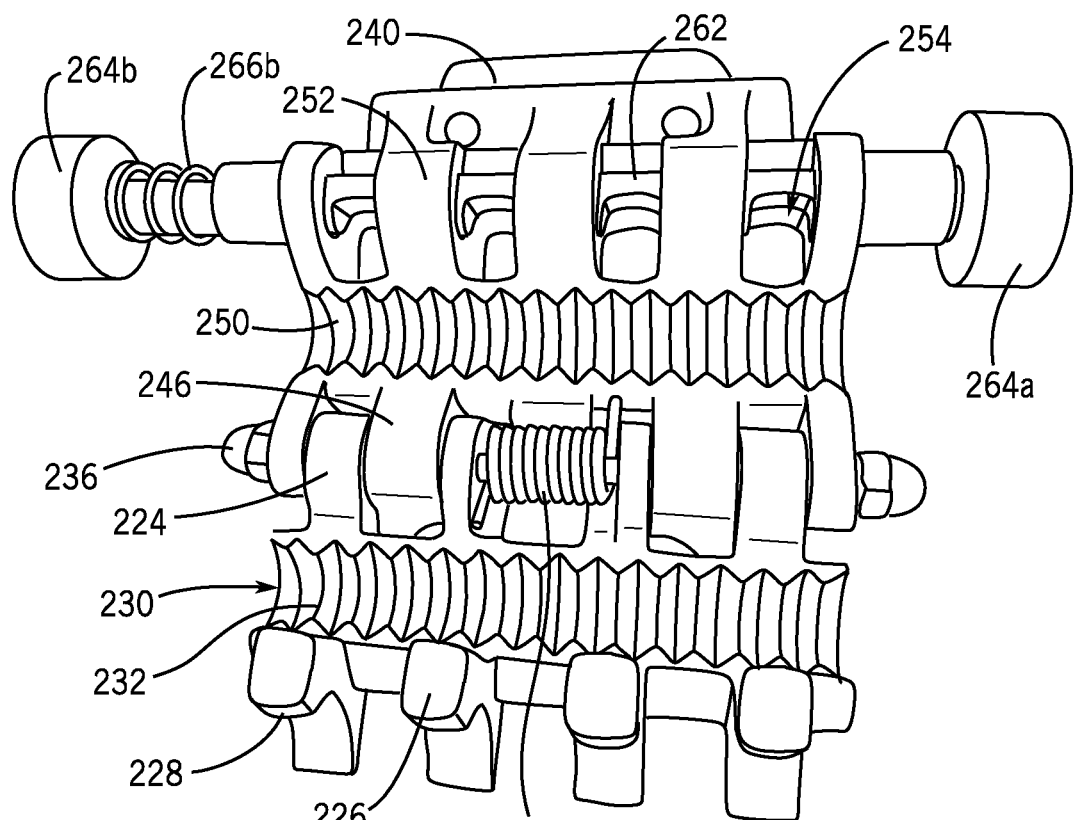
FIG. 4 is a top plan view in partial cutaway of the attachment mechanism of FIG. 2 revealing a biased hinge.
Figure 5:
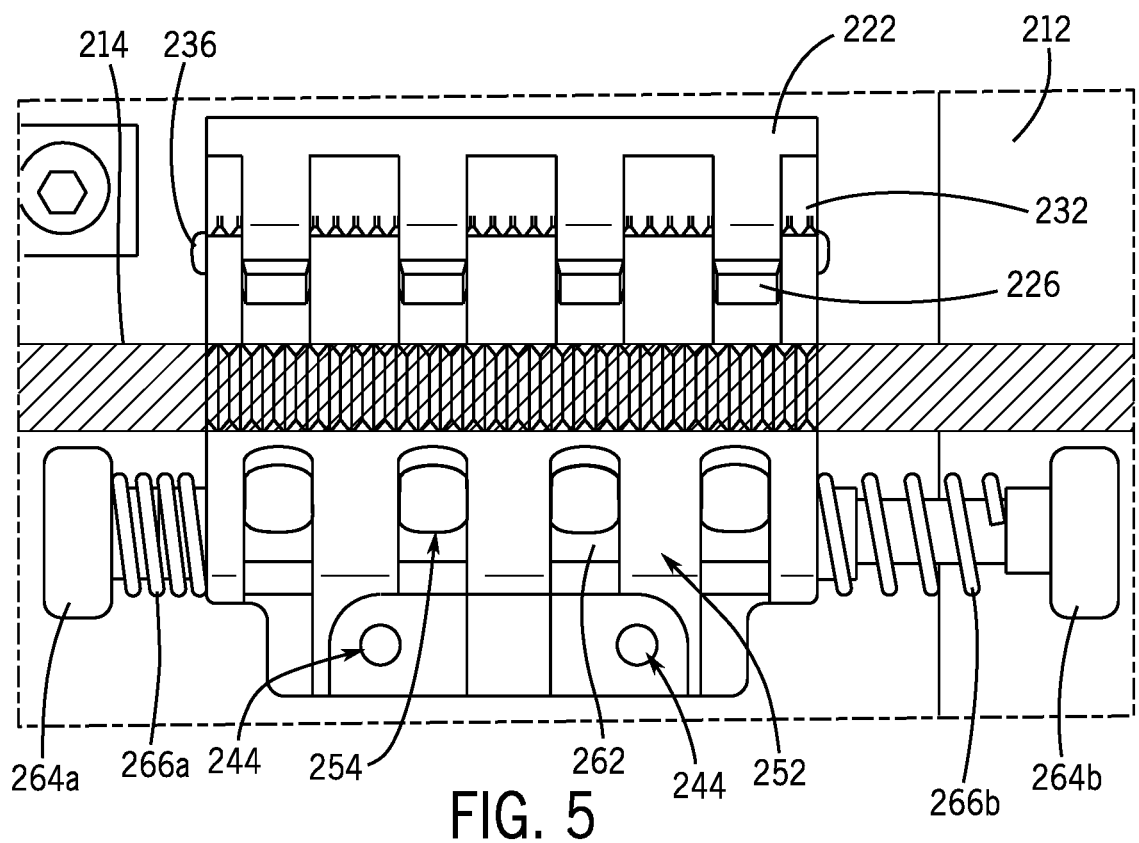
FIG. 5 is a top, front isometric view of the attachment mechanism of FIG. 2 with the clamp partially closed about a cable and with the latch in an open configuration.
Figure 6:
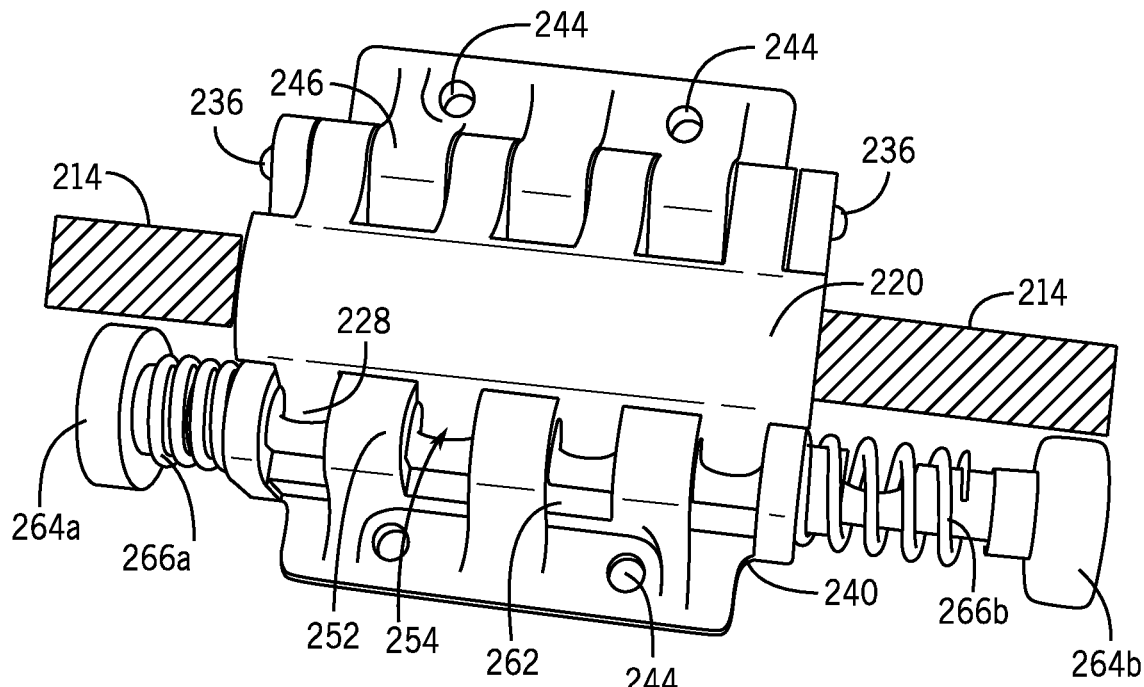
FIG. 6 is a top isometric view of the attachment mechanism of FIG. 2 with the clamp closed about a cable and with the latch in an open configuration.

As shown in FIGS. 2-7, the attachment mechanism 200 is configured as a grip or clamping device for selectively coupling and decoupling the housing 212 of the node 210 to a rope, line, or cable 214 (see FIGS. 4-6). The clamping or attachment mechanism 200 includes a fixed part or clamp base 240 and a clamp grip 220 pivotably attached to the clamp base 240 by a hinge 234. The clamp base 240 may have base flanges 242 which extend from sides of the clamp base 240 and which may further define a number of mounting holes 244 therethrough. The mounting holes 244 may be configured to align with corresponding threaded blind holes in the node 210. Bolts (not shown) may be placed through the mounting holes 244 and fastened within the blind holes to fix the attachment mechanism 200 to the housing 212 of the node 210.

The clamp base 240 may further be considered to have three different functional aspects defined by three structural areas, base hinge knuckles 246, a cable channel 248 for receiving the cable 214, and a latch 260 for locking the clamp grip 220 to the clamp base 240. The cable channel 248 is defined within the clamp base 240 as a substantially half-cylinder recess. A number of raised ribs 250 may be formed within the wall of the clamp base 240 defining the cable channel 248. In the exemplary embodiment shown in the figures, the ribs 250 may be arranged perpendicular to a longitudinal axis of the cable channel 248 such that they form raised arcs with wells between adjacent base ribs 250. In some embodiments, the base ribs 250 may be spaced apart from each other equidistantly along the longitudinal axis of the cable channel 248. In other embodiments, spacing between the base ribs 250 may be at varied spacing patterns or at irregular spacing distances.

The base hinge knuckles 246 may extend outwardly from one lateral edge of the clamp base 240 adjacent to and along the longitudinal length of the cable channel 248. The base hinge knuckles 246 each define a cylindrical through-hole therein in axial alignment with each other and parallel to the longitudinal axis of the cable channel 248. The base hinge knuckles 246 may be spaced apart from each other either equidistantly or at uniform spacing. The width of the hinge knuckles 246 may be uniform or varied.

The latch 260 may extend outwardly from another lateral edge of the clamp base 240 adjacent to and along the longitudinal length of the cable channel 248 opposite from the base hinge knuckles 246. The latch 260 may be formed by a number of support blocks 252 arranged in series parallel to the longitudinal axis of the cable channel 248. The support blocks 252 each define a bore-hole therein in axial alignment with each other and parallel to the longitudinal axis of the cable channel 248. The support blocks 252 may extend substantially above a lateral edge of the half-cylinder form of the cable channel 248 as depicted in FIG. 3. A latch pin 262 may extend within the through-holes of the support blocks 252 and further extend outward from each end of the outer support blocks 252 on opposing ends of the latch 260. The bore-holes in each of the support blocks 252 may define a cross-sectional shape substantially congruent with a cross-sectional shape of the latch pin 262. For example, as shown to good advantage in FIGS. 5-7, at its largest cross-sectional size, the latch pin 262 may be flat on three sides and curved on a fourth side. In other embodiments, the latch pin 262 may be flat on all sides to define a square or rectangular cross section at its largest cross-sectional size, or it may have other cross-sectional shapes.

The latch pin 262 may further be formed with keyways 254 therein with latch plates 268 defined on each side of each keyway 254. As shown in FIGS. 4-6, the keyways 254 may be notches formed within the interior edge of the latch pin 262. The keyways 254 may be sized to conform to the width of the spacing between each of the support blocks 252.

In other embodiments, the keyways 254 may be wider or narrower. Similarly, the latch plates 268 may be sized to conform to the width of the spacing between each of the support blocks 252 and, in the exemplary embodiment shown, define the largest cross-sectional are of the latch pin 262.

Figure 7:
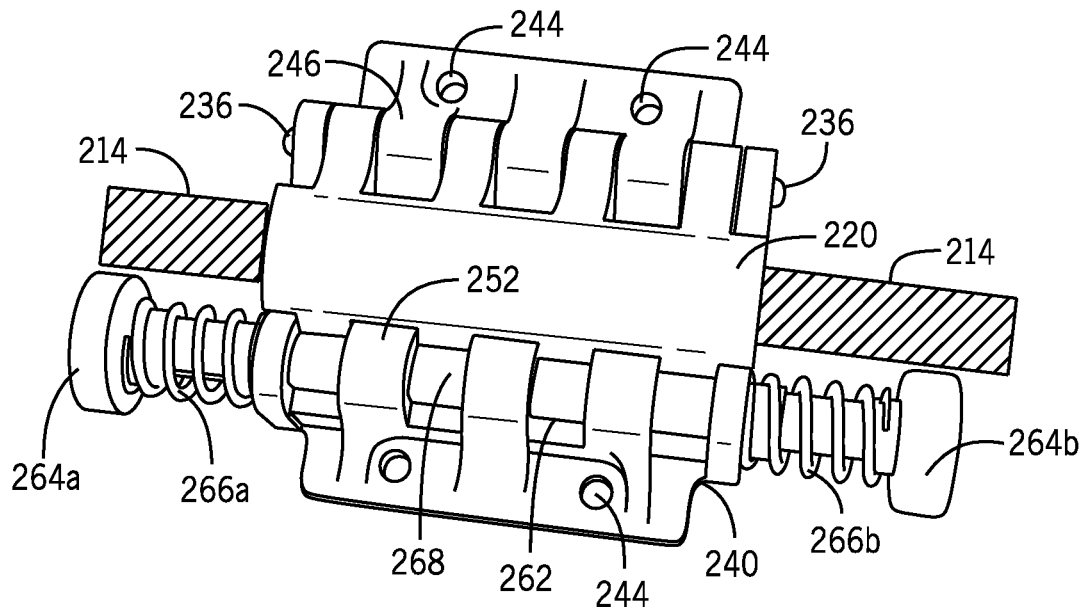
FIG. 7 is a top isometric view of the attachment mechanism of FIG. 2 with the clamp closed about a cable and with the latch in a closed configuration.

As noted, the latch pin 262 may extend beyond the support blocks 252 on each end of the latch 260. Engagement knobs 264a/b may be affixed to each end of the latch pin 262. The engagement knobs 264a/b may be of any appropriate size and shape for interfacing with a device for attaching the node 210 to the cable 214. In the exemplary embodiment shown in the figures, the engagement knobs 264a/b are toroidal or donut-shaped and are larger in diameter than the largest cross-sectional dimension of the latch pin 262. A pair of latch springs 266a/b are further mounted on the opposing ends of the latch pin 262 between the end support blocks 252 and the engagement knobs 264a/b. The latch springs 266a/b are larger in diameter than the latch pin 262 and smaller in diameter than the engagement knobs 266a/b and the exterior surface dimensions of the end support blocks 252. In an equilibrium position as shown in FIGS. 2, 3, and 7, the latch springs 266a/b are of equal length and are under commensurate compression. In the equilibrium position, the latch plates 268 of the latch pin 262 are positioned in between each of the support blocks 252 while the keyways 254 are positioned within the bore holes of the support blocks 252.

The clamp grip 220 may have a grip body 232 that supports three different functional, structural elements: a set of hinge knuckles 224, a grip channel 230 for clamping around the cable 214, and a number of latch fingers 226. The grip channel 230 is defined within the grip body 222 as a substantially cylindrical recess. A number of raised ribs 232 may be formed within the wall of the grip body 222 defining the grip channel 230. In the exemplary embodiment shown in the figures, the ribs 232 may be arranged perpendicular to a longitudinal axis of the grip channel 230 such that they form raised arcs with wells between adjacent ribs 232. In some embodiments, the ribs 232 may be spaced apart from each other equidistantly along the longitudinal axis of the grip channel 230. In other embodiments, spacing between the ribs may be at varied spacing patterns or at irregular spacing distances.

The grip hinge knuckles 224 may extend outwardly from one lateral edge of the grip body 222 adjacent to and along the longitudinal length of the grip channel 230. The grip hinge knuckles 224 each define a cylindrical through-hole therein in axial alignment with each other and parallel to the longitudinal axis of the grip channel 230. The grip hinge knuckles 224 may be spaced apart from each other either equidistantly or at uniform spacing. The width of the grip hinge knuckles 224 may be uniform or varied and may be sized and spaced to interface with the spaces between the base hinge knuckles 252.

The latch fingers 226 may extend outwardly from another lateral edge of the grip body 222 adjacent to and along the longitudinal length of the grip channel 230 opposite from the hinge knuckles 224. The latch fingers 226 further extend substantially tangential to the edge of the cylindrical form of the grip channel 230 and beyond the lateral edge of the grip channel 230 as depicted in FIG. 3. The terminal end of each latch finger 226 may be shaped like a boot with a surface defining latch catch 228, as shown to good advantage in FIG. 3. The latch fingers 226 may be sized to fit in between the support blocks 252 of the latch 260 on the clamp base 240. In particular, each of the latch catches 228 may be sized and shaped to fit within a respective keyway 254 on the latch pin 262 as further described below.

The clamp grip 220 is coupled to the clamp base 240 by interlacing the grip hinge knuckles 224 with the base hinge knuckles 246, aligning the through-holes in the grip hinge knuckles 224 with the base hinge knuckles 246, and inserting a hinge pin 234 within the through-holes in the grip hinge knuckles 224 and the base hinge knuckles 246. An internal hinge spring 236 may be placed on the hinge pin 234 and reside within one or more of the through-holes in the grip hinge knuckles 224 and the base hinge knuckles 246, for example, as shown in FIG. 4. Some of the through-holes in the grip hinge knuckles 224 and the base hinge knuckles 246 may be of larger diameter than other through-holes in the remaining knuckles 224, 246 in order to accommodate the larger diameter of the hinge spring 236. The hinge spring 236 may be a torsion spring and may be biased to urge the clamp grip 220 into an open position with respect to the clamp base 240. Fasteners or caps may be placed upon one or both ends of the hinge pin 234 in order to retain the hinge pin 230 within the grip hinge knuckles 224 and the base hinge knuckles 246. In one exemplary embodiment, the hinge pin 234 may be a bolt with a head on one end and a nut threaded on the opposing end to retain the hinge pin 234 within the grip hinge knuckles 224 and the base hinge knuckles 246.

The attachment mechanism 200 may be used to attach a node 210 to a cable 214 by placing the cable 214 within the cable channel 248 and then rotating the clamp grip 220 about the hinge pin 234 to engage the grip channel 230 with the top surface of the cable 214. In practical operation, a node attachment device (an exemplary embodiment of which is further described below) places a node 210 in alignment with a cable 214 and holds the node 210 in a fixed position. The node attachment device then engages either one of the engagement knobs 264a/b at either end of the latch pin 262 to force the latch pin 262 in one direction or the other. With such engagement, the latch springs 266a/b are biased in compression and extension, respectively, as indicated in FIG. 5. In this position, the keyways 254 of the latch pin 262 are further aligned with the spaces between each of the support blocks 252.

Next the node attachment device pivots the clamp grip 220 about the hinge pin 234, overcoming the bias of the hinge spring 236, and positions the clamp grip 220 over the cable 212 such that the cable is sandwiched between the clamp grip 220 and the clamp base 240 within the cable channel 248 and the grip channel 230. In this position, the latch fingers 226 extend between the support blocks 252 and through the keyways 254 in the latch pin 262 such that the latch catches 228 are at a level beneath the latch pin 262 as shown in FIG. 6. The node attachment device then releases the engagement knobs 264a/b of the latch 260 and the latch springs 268 force the latch pin 262 back to its equilibrium position such that the latch plates 268 are positioned between the support blocks 252 and over the latch catches 228. In this manner, the latch fingers 226 are retained by the latch pin in the clamp base 240 (as shown in in FIG. 7), the cable 214 is clamped within the attachment mechanism 200, and the node 210 is attached to the cable 214.

It may be appreciated that the node attachment device exerts significant force on the clamp grip 220 in order to position the latch catches 228 beneath the latch plates 268 of the latch pin 262 and maintain a desired attachment force by the attachment mechanism 200 on the cable 214. The attachment mechanism 200 may be formed of molded plastics and corrosion resistant metals depending upon the application and environment for deployment. In other embodiments, the attachment mechanism can be made of molded or machined metals (e.g., steel). In some exemplary embodiments, the clamp may be able to withstand a force of between 500-1000 lb. (2225-4449 N) in each direction (including longitudinal shear) and withstand breaking under a load of up to 2000 lb. (8898 N) in any direction.

The grip ribs 232 and base ribs 250 may aid in providing a strong frictional grip along the cable 214 in resistance to shear forces. The cable 214 can be formed of a suitable synthetic rope or cable material, from natural fibers, from a wire cable or other metal material, or from a combination thereof. The cable 214 can be configured for deploying one or more seismic nodes 210 to the ocean floor, or for towing one or more seismic nodes 210 through a water column. In some embodiments, the cable 214 is formed solely of a passive strength component, while in other embodiments the cable 214 includes power and data lines for communication with individual nodes 210 attached to the cable 214. In some embodiments, the diameter of the grip channel 230 and the cable channel 248 may be designed to accommodate different diameters of cable 214 (e.g., ½ in. (12.5 mm) or ¾ in. (19 mm)). Additionally, if the cable 214 is a synthetic woven rope or other material of lower density, the grooves between the ribs 232, 250 provide space for such compressed materials to escape and further provide a structural interlock between the cable 214 and the attachment mechanism 200.

In some embodiments, device with a larger diameter grip channel 230 and cable channel 248 may be modified with inserts to reduce the diameters of the a larger diameter grip channel 230 and cable channel 248 to accommodate a smaller diameter cable 214. Such inserts may be ribbed in order to mechanically and frictionally interface with the grip channel 230 and cable channel 248 and similarly provide ribs on the opposing side to interface with the cable 214.

In order to remove a node 210 from a cable 214, the node attachment device may be switch to a detachment mode. As the cable 214 passes through the node attachment device with a node, the node attachment device will capture the node and hold it in a fixed position to engage the engagement knobs 264a/b in order to bias the latch pin 262 in an open position. By moving the latch pin 262 longitudinally, the latch plates 268 are moved off the latch catches 228 and the keyways 254 are positioned over the latch fingers 226, thereby allowing the latch fingers to release from the latch 260. As the hinge spring 236 is arranged to bias the clamp grip 220 in an open position, the clamp grip 220 will spring open and release the cable 214 from within the base channel 248 and grip channel 230. The node attachment device then releases the engagement knobs 164a/b and the latch springs 166a/b return to their equilibrium position such that the latch plates 268 are positioned between the support blocks 252. The node attachment device then removes the node 210 from the work area as further described below.

Figure 8:
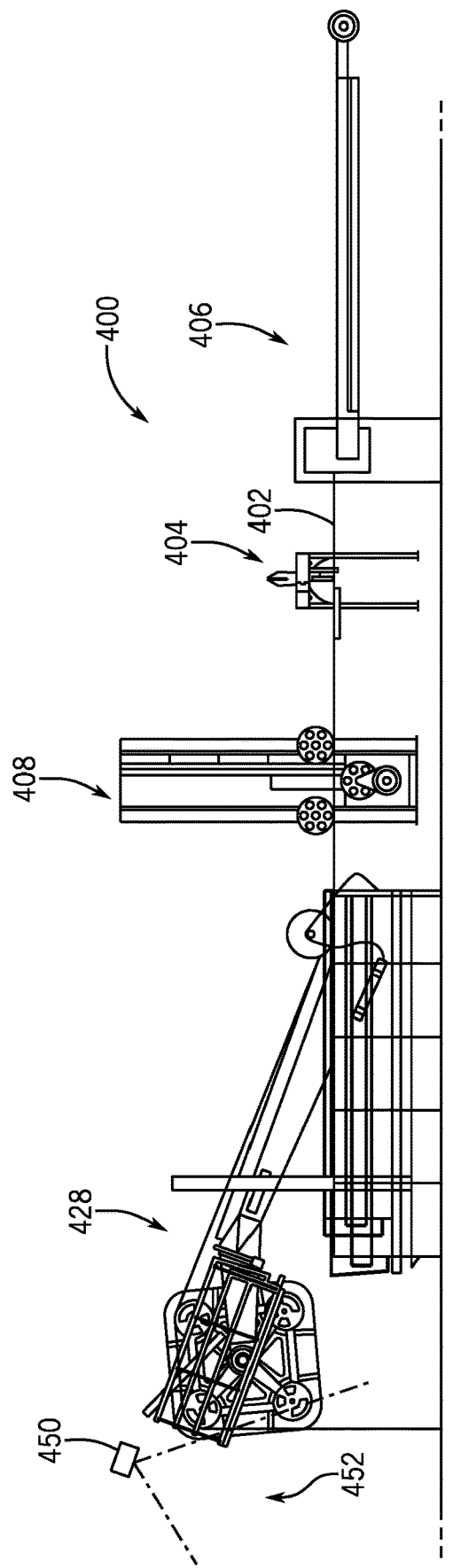
FIG. 8 is a schematic side elevation view of various components on a back deck of a seismic survey vessel used to overboard and onboard a streamer cable and for attaching and removing a plurality of nodes thereto.

FIG. 8 is a schematic depiction of major components of a modular node deployment system 400 configured for implementation on the aft deck of a marine vessel. The system 400 may have particular utility in attaching sensor nodes to a cable 402 for deployment off the stern of the marine vessel into a body of water, e.g., for seismic survey purposes. The cable 402 may be stored on and unwound from one or more storage spools (not shown). The cable 402 may first pass through a forward buffer system 406 to help control the speed of the cable 402 as it passes through a node attachment-detachment station 404. After a node is attached at the attach-detach station 404, the cable 402 travels through an aft buffer system 408, which operates in conjunction with the forward buffer system 406 to control the speed of the cable 402 during attachment or detachment of a nose in the attach-detach station 404. The structure, configuration, and functionality of the forward buffer system 406, the attach-detach station 404, and the aft buffer system 408 will be explained in greater detail further below.

In addition, an overboarding unit 428 is positioned at the stern of the marine vessel to pay out and take up cable from the body of water. The structure and control of the overboarding unit 428 may be specifically designed to avoid damage to nodes attached to the cable 902 as the nodes pass through the overboarding unit 428. Particular implementations of such overboarding units 428 are described in further detail below. Further, a position sensing device 450 may be incorporated to operate in conjunction with the overboarding system 428 for the purpose of identifying the position of a node within a field of view 452 with respect to the overboarding system 428 during retrieval of the cable 402 in order to provide precise control signals to the overboarding unit 428. Integration of such position sensing devices 950 with the overboarding unit 428 are discussed in greater detail below.

An implementation of a seismic node deployment system 500 similar to that of FIG. 8 is depicted schematically in FIGS. 9A-10C. The system 500 is configured to attach and detach a plurality of seismic receiver nodes 510 onto and from a cable 502 for deployment from and return to a marine vessel. Nodes 510 can be seismic nodes, receivers, or other autonomous sensing devices, or, alternatively or in addition, acoustic pingers or other transponders for location identification or other information transmission attached at positions spaced apart along the cable 502. The system 500 may include a forward buffer system 506 and an aft buffer system 508 for controlling the relative speed of the cable 502 with respect to a node coupling device 504 for attachment and detachment of a plurality of nodes 510 to the cable 502 in spaced apart locations. The forward and aft buffer systems 506, 508 may periodically temporarily divert portions of the cable 502 to take up and pay out sections of the cable 502 to reduce the speed of a portion for node attachment. In some embodiments, the periodic diversions of the cable 502 in the forward and aft buffer systems 506, 508 may be at regular intervals. In other embodiments, the periodic diversions may occur at intermittent intervals with no fixed or regular time frame between occurrences, but rather occur upon a command to signal to attach or detach a node 510 to or from the cable 502.

The cable 502 may be stored upon a storage winch or spool 512 from which the cable 502 is payed out for deployment in the water column or wound around for storage when not in use. A traction winch or cable tensioner 514 may be positioned between the forward buffer system 506 and the aft buffer system 508 in order to maintain appropriate tension on the cable 502 as it is payed out or hauled in. The node coupling device 504 may be positioned between the cable tensioner 514 and the aft buffer system 508.

The forward buffer system 506 may include a forward pinion pulley 514 that travels laterally on a lateral rack 516. In some embodiments, a drive motor may be attached to the forward pinion pulley 514 and configured to move the forward pinion pulley 514 back and forth along the lateral rack 516. The aft buffer system 508 may include a first aft base pulley 520 and a second aft base pulley 522 both fixedly positioned adjacent to the base of a vertical rack 528. The first aft base pulley 520 may be positioned on a forward side of the vertical rack 528 and the second aft base pulley 522 may be positioned on an aft side of the vertical rack 526. An aft pinon pulley 524 may be movably attached to the vertical rack 526 and aligned between the first and second aft base pulleys 520, 522. In some embodiments, a drive motor may be attached to the aft pinion pulley 524 and configured to move the aft pinion pulley 524 up and down along the vertical rack 526.

An exemplary deployment operation of the system 500 is depicted in the series of FIGS. 9A-9D. To prepare the system 500 for operation, the cable 502 must be unwound from the spool 512 and threaded through the components. The spool 512 may be manually driven while threading the cable 502 through the system 500, i.e., through the forward buffer system 506, the cable tensioner 514, the node coupling device 504, the after buffer system 508, and through an overboarding unit (not shown in the schematics of 9A-9D). An end weight may be connected to the first end of the cable 502, typically using a deck crane (not shown).

Figure 9A:
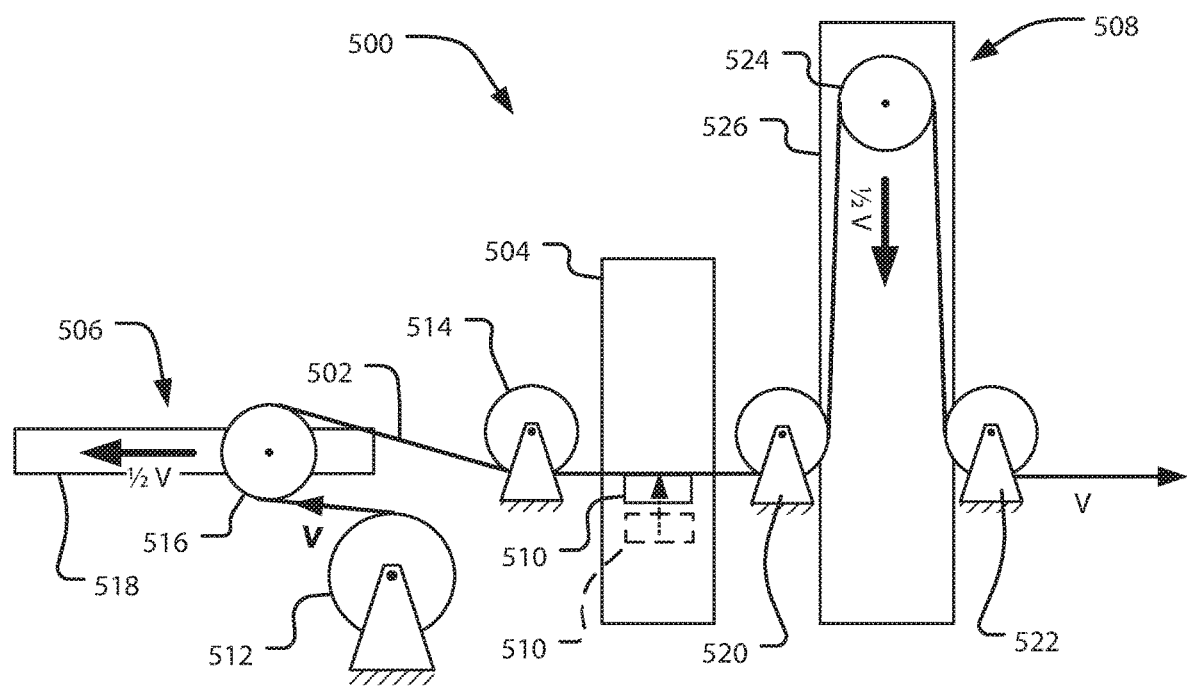
FIGS. 9A-9D are schematic diagrams depicting functional steps of an embodiment for seismic node attachment and deployment.
Figure 9B:
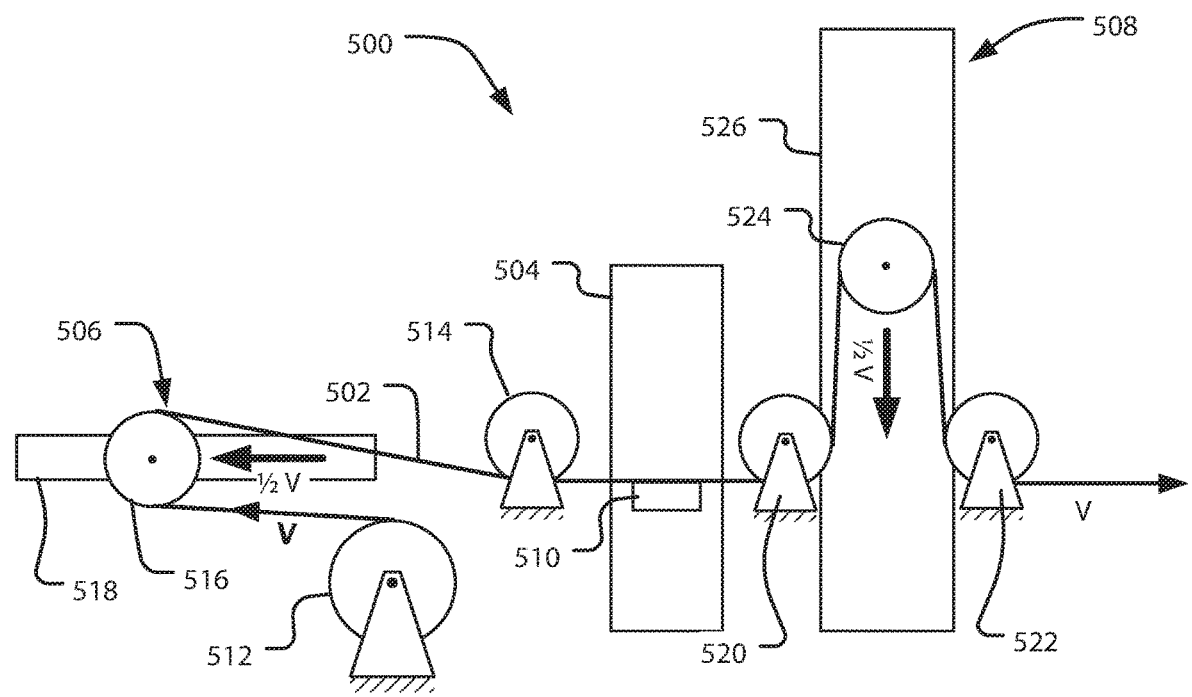

Initially, as shown in FIG. 9A, the cable 502 is unwound from storage on the spool 512 and is threaded around the forward pinion pulley 516. The spool 512 is typically driven by a motor and functions as a winch when both coiling and uncoiling the cable 502 from the spool 512 due to the significant mass of the cable 502 and the related moment generated while the spool 512 rotates. When the cable 502 is unwound from the spool 512, the spool 512 provides tension on the cable 512 as it pays out. The forward pinion pulley 516 is movably mounted on the lateral rack 518 and may be driven laterally along the lateral rack 518 by a motor (not shown) that is under control of a control system as further described herein. In one exemplary implementation, the lateral rack 518 may include a linear array of gear teeth along its length and the motor may turn a gear that interfaces with the linear gear teeth to move the forward pinion pulley 516 back and forth on the lateral rack 518.

After winding around the forward pinion pulley 516, the cable 502 then passes through the cable tensioner 514, which pulls the cable 502 from the spool 512 at a speed synchronized with the speed of the vessel. The cable tensioner 514 may be composed of one or more pulleys through which the cable 502 passes and which are configured to provide appropriate tension on the cable 502 when deploying and retrieving the cable 502 from the water column. The one or more of the pulleys forming the cable tensioner 514 may be motor-driven with appropriate transmission gearing in order to protect the forward pinion pulley 516 and the spool 512 from excessive force that may be placed on the cable 502 by the water column.

The cable 502 next passes through the node coupling device 504, which is configured to attach a plurality of sensor nodes 510 serially onto the cable 502, typically at fixed interval spacings (and to further detach the nodes 510 from the cable 502 in an opposite operation). In one exemplary embodiment, each node 510 may be equipped with an attachment mechanism (e.g., the attachment mechanism 200 of FIGS. 2-7) that clamps the node 510 onto the cable 502. The node coupling device 504 may be configured to pick a node 510 with an attachment mechanism from a provided supply of nodes 510, place the attachment mechanism on the node 210 adjacent to the cable 502, compress a latch spring to open a latch on the attachment mechanism, close a clamp of the attachment mechanism about the cable 502, and release the latch spring to close the latch and secure clamp about the cable 502 to connect the node 510 to the cable 502.

After passing through the node coupling device 504, the cable 502 may be threaded through a number of pulleys forming the aft cable buffer 508. The first aft base pulley 520 and the second aft base pulley 522 may be located at fixed positions on lateral sides of the base of the vertical rack 526 along which the aft pinion pulley 524 moves. The aft pinion pulley 524 may be driven vertically along the vertical rack 526 by a motor (not shown) that is under control of a control system as further described herein. In one exemplary implementation, the vertical rack 526 may include a linear array of gear teeth along its length and the motor may turn a gear that interfaces with the linear gear teeth to move the aft pinion pulley 516 up and down on the vertical rack 526.

As shown in FIGS. 9A-9D, the cable 502 may pass under each of the first aft base pulley 502 and the second aft base pulley 522 and pass over aft pinion pulley 516. At the lower or base end of the vertical rack 526, the aft pinion pulley 516 may pass between each of the first aft base pulley 502 and the second aft base pulley 522 to a low point of its vertical travel and disengage from contact with the cable 502. After passing through the aft cable buffer 508, the cable 502 with attached nodes 510 may be deployed into the water column via an overboarding unit (not shown).

At system start, the selected spool 512 will enter into a tension mode, and the cable tensioner 514 will start pulling out cable 502 from the spool 512 at a cable speed synchronized with the vessel speed. The aft buffer 508 will accumulate a maximum amount of cable length by moving to its upper position. At a signal for "attach node" the aft buffer 508 will start paying out from the accumulated length, thereby keeping a steady cable speed paying out from the vessel. Simultaneously the forward buffer 506 will start accumulating cable by moving forward, and thereby keep a steady cable speed out from the spool 512. Together this will keep the cable 502 stationary in the node coupling device 504 for a long enough time to attach the node 510 to the cable 502. When the aft buffer 508 reaches its complete downward or "open" position, the forward buffer 506 will stop, and the cable 502 with a node 510 connected will move toward the overboard unit. As soon as the system 500 detects that the node 510 has passed through the zone of the aft buffer 508, the forward buffer 506 will move to its aft position and the aft buffer 508 will start accumulating cable at a synchronized speed. As soon as the aft buffer 508 has accumulate a maximum length of cable 502 by reaching the upper position, the system 500 is ready for attaching another node 510.

A configuration and operation for deployment of the cable 502 and attachment of the nodes 510 as generally described above is shown in greater detail in FIGS. 9A-9D. The forward pinion pulley 516 begins in an aft position along the lateral rack 518 and the aft pinion pulley 524 begins in an upper position on the vertical rack 526. The cable tensioner 514 starts pulling cable at a constant speed. Thus, the cable 502 is unwound from the spool 512 such that it travels linearly at a constant velocity V. In some implementations, the linear velocity of the cable 502 may be up to 5 knots (2.5 m/s). When it is determined that the proper separation distance along the cable 502 between nodes 510 is reached, the forward pinion pulley 516 begins moving forward on the forward rack 518 at a speed of substantially ½ V to thereby take up the length of cable 502 unwinding from the spool 512. Simultaneously, the aft pinion pulley 524 begins moving downward on the vertical rack 526 at a speed of substantially ½ V to thereby pay out the cable 502 previously extended along the vertical rack 526 to be overboarded at a velocity V. As the forward and aft pinion pulleys 516, 524 move in their respective directions at half the speed of the cable 502 as it pays out, the relative speed of the cable 502 with respect to the node coupling device 504 is OV, i.e., the portion of the cable 502 passing through the node coupling device 504 is effectively not moving in that reference frame.

By effectively halting the movement of the cable 502 through the node coupling device 504, the node 510 can be easily attached to the desired location on the cable 502 during the time it takes the forward and aft pinion pulleys 516, 524 to traverse lengths of the lateral and vertical racks 518, 526, respectively. Typically the time for such traversal is on the order of several seconds depending upon the length of the racks 518, 526 and the speed of the cable 502, e.g., if the overboarding velocity V is 5 knots (2.5 m/s). This is adequate time for the node coupling device 504 to pick a node 510 from a supply, place the clamp of an attachment mechanism around the cable 502, compress a latch spring to open a latch on the attachment mechanism, close a clamp of the attachment mechanism about the cable 502, and release the latch spring to close the latch and secure clamp about the cable 502 to connect the node 510 to the cable 502 to complete the attachment of the node to the cable 502.

Figure 9C:
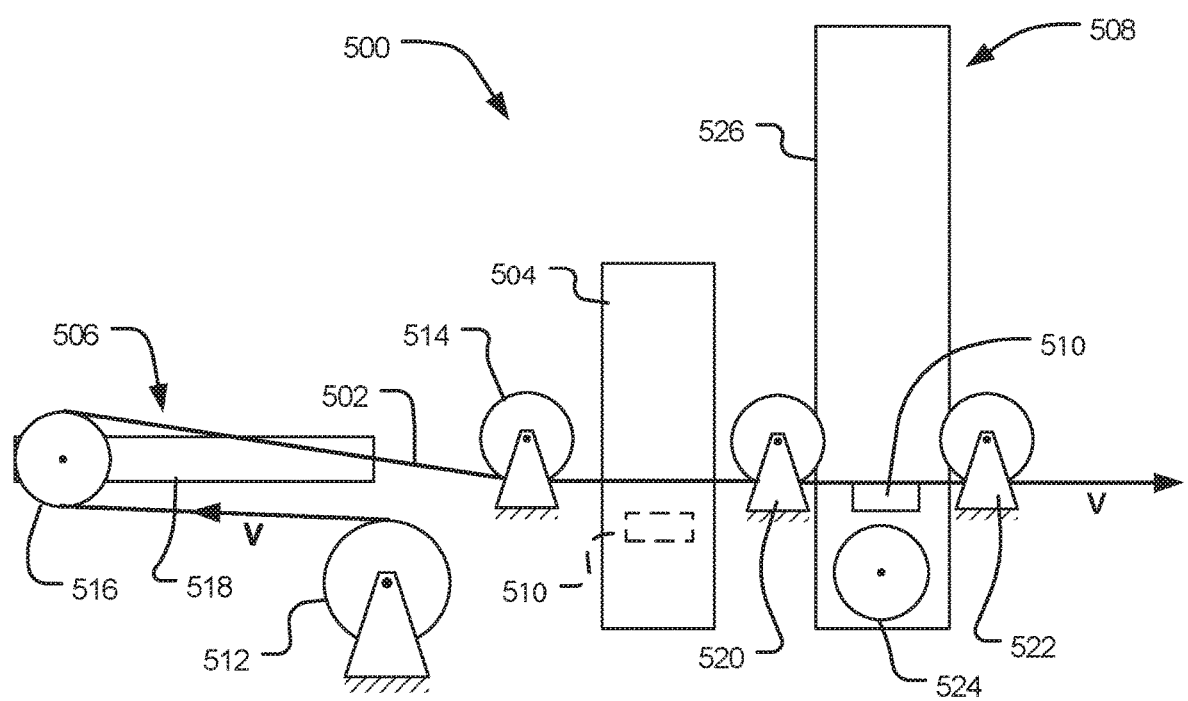

Once the node 510 is attached to the cable 502, the forward and aft pinion pulleys 516, 524 have completed their traverse of the lateral and vertical racks 518, 526, respectively. At this point the aft pinion pulley 524 is positioned below the first and second aft base pulleys 520, 522 as shown in FIG. 9C and is no longer in contact with the cable 502. While the forward and aft pinion pulleys 516, 524 are stationary in the forward and bottom positions on the lateral and vertical racks 518, 526, respectively, the cable 502 continues to be pulled by the cable tensioner 514 and travels through the entire system 500 at the full, constant deployment speed V. As shown, the coupled node 510 is attached to extend from the bottom of the cable 502. In this manner, the node 510 does not interfere with either of the first and second aft base pulleys 520, 522, nor does the node 510 interfere with the aft pinion pulley 524, which is positioned at a sufficient distance beneath the path of the cable 502 for clearance of the node 510 over the top of the aft pinion pulley 524. Also at this time, a new node 510' may be placed within the node coupling device 504 in a position for picking and placement of the new node 510' on the cable 502.

Figure 9D:
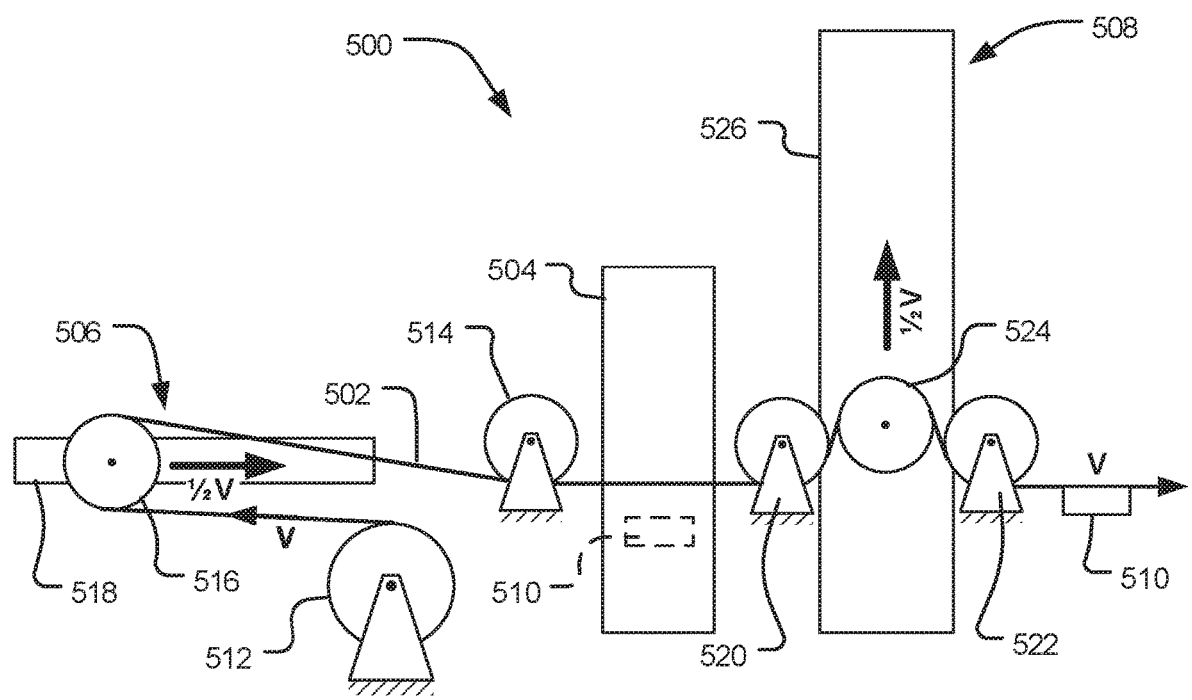

Once the node 510 has traveled beyond the second aft base pulley 522, the forward and aft pinion pulleys 516, 524 begin traveling along the lateral and vertical racks 518, 526, respectively, typically at a speed of ½ V, to their starting positions at the forward and top positions on the lateral and vertical racks 518, 526, respectively, as shown in FIG. 9D. The cable 502 maintains its overboarding speed of V at the stern of the marine vessel as the forward and aft pinion pulleys 516, 524 move. Once the forward and aft pinion pulleys 516, 524 reach their starting positions, the cable 502 is payed out at velocity V along its length until the control system for the seismic node deployment system 500 determines that the desired separation distance between nodes 510 is reached and the attachment cycle begins again as described above beginning with FIG. 9A.

During the entire node attachment cycle, the velocity V of the cable 502 unwinding from the spool is the same as the velocity V of the cable 502 when overboarding off the stern of the marine vessel into the water column and the this velocity V remains constant throughout the cable deployment process.

Figure 10A:
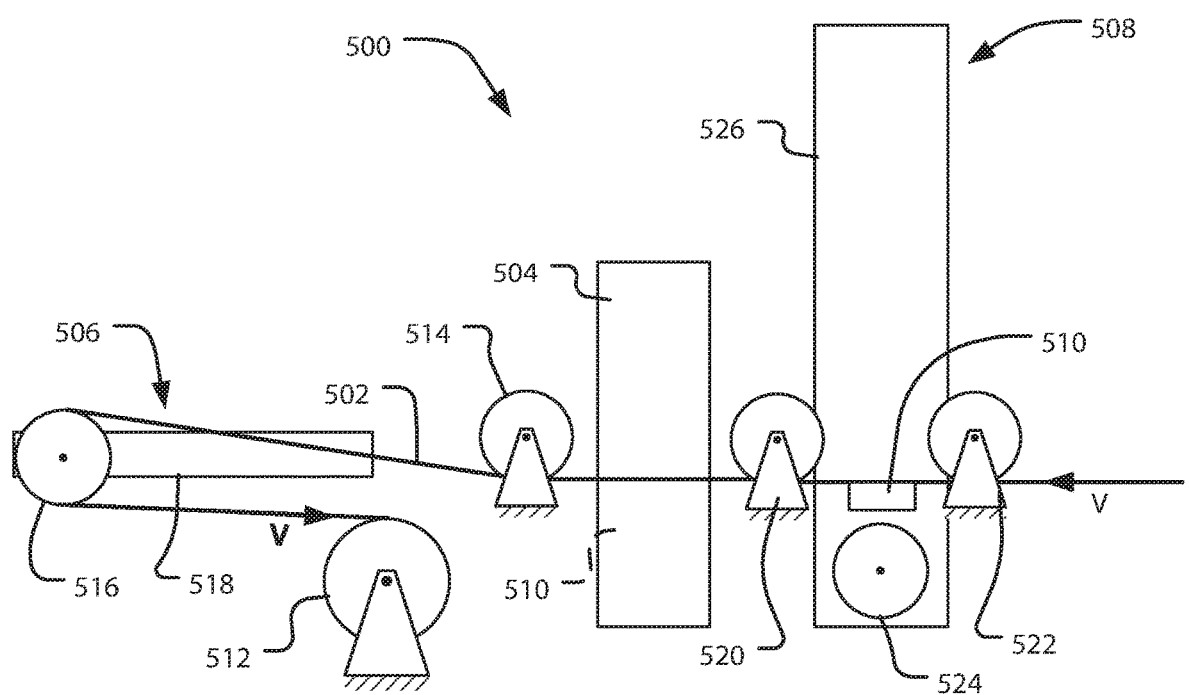
FIGS. 10A-10C are schematic diagrams depicting functional steps of an embodiment for seismic node retrieval and detachment.
Figure 10B:
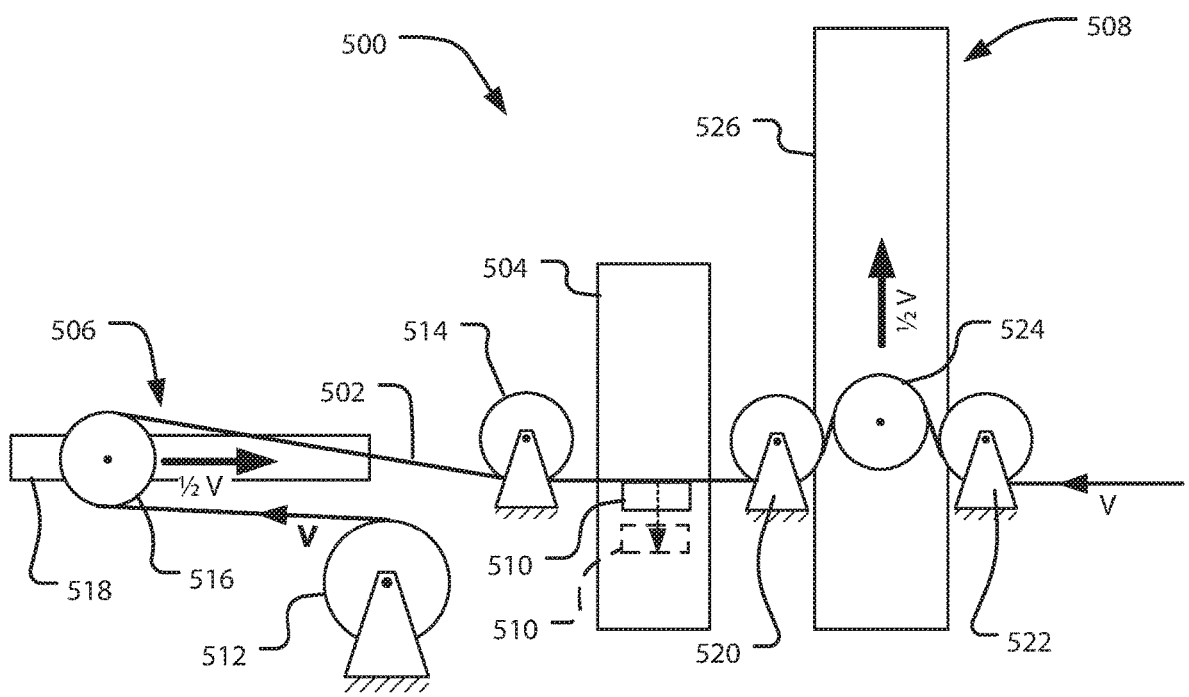
Figure 10C:
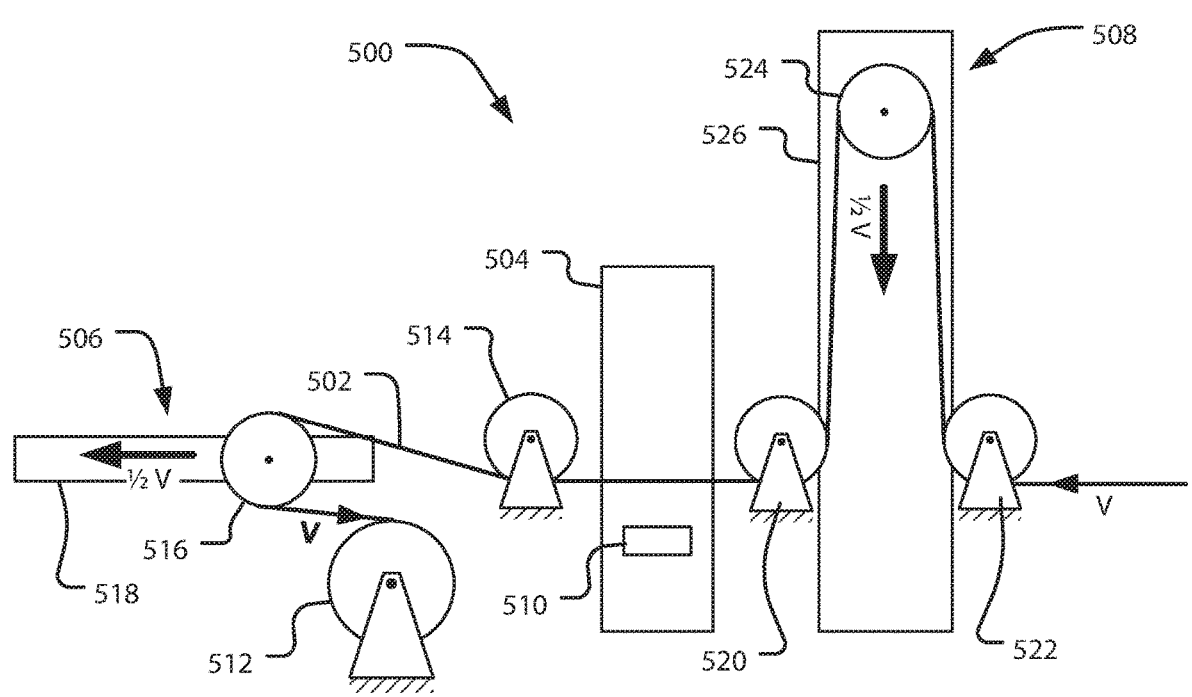

FIGS. 10A-10C depict a node detachment process performed by the seismic node deployment system 500. At the start of retrieval of the cable 502 from the seismic medium (e.g., the body of water) the aft buffer 508 will be in lower or "open" position, the cable tensioner 514 will reel the cable 502 in at a synchronized speed with the vessel. The spool 512 will be in a tension mode rotating in an opposite direction to wind up the cable 502. Sensors will detect when a node 510 approaches the node coupling device 504. When a node 510 reaches the correct position in the node coupling device 504, the aft buffer 508 will start accumulate cable 502 at a synchronized speed with the vessel, thereby keeping a steady cable take up speed out of the water. Simultaneously, the forward buffer 506 will start moving backwards at the same speed, thereby keeping the node 510 at a steady position in the node coupling device 504 for long enough to disconnect the node 510 from the cable 502. When the node 510 is disconnected, the forward buffer 506 will move forward toward its center position, and the aft buffer 508 will move toward its lower or "open" position. As soon the aft buffer reaches the "open" position, the system 500 is ready for receiving the next node 510.

In greater detail, as shown in FIGS. 10A-10C, in order to begin the cable retrieval process, the aft pinion pulley 524 is positioned on the vertical rack 526 below the first and second aft base pulleys 520, 522 (as shown in FIG. 10A) and is no longer in contact with the cable 502. The forward pinion pulley 516 is additionally in the fully forward position on the lateral rack 518. While the forward and aft pinion pulleys 516, 524 are stationary in the forward and bottom positions on the lateral and vertical racks 518, 526, respectively, the cable 502 may be reeled in or onboarded through the system 500 at the full deployment speed V. As shown in FIG. 10A, the coupled node 510 is attached to extend from the bottom of the cable 502. In this manner, the node 510 does not interfere with either of the first and second aft base pulleys 520, 522, nor does the node 510 interfere with the aft pinion pulley 524, which is positioned at a sufficient distance beneath the path of the cable 502 for clearance of the node 510 over the top of the aft pinion pulley 524.

Once the node 510 on the cable 502 reaches the node coupling device 504, the control system causes the forward and aft pinion pulleys 516, 524 begin traveling along the lateral and vertical racks 518, 526, respectively, typically at a speed of ½ V, to halt the node 510 at the node coupling device 504. Even though the cable section in front of the node coupling device 504 is stationary relative to the node coupling device 504, the cable 502 maintains an onboarding speed of V at the stern of the marine vessel and similarly a spooling speed of V as the forward and aft pinion pulleys 516, 524 move.

By effectively halting the movement of the cable 502 through the node coupling device 504, the node 510 can be easily detached from the cable 502 as indicated in FIG. 10B during the time it takes the forward and aft pinion pulleys 516, 524 to traverse lengths of the lateral and vertical racks 518, 526, respectively. Typically the time for such traversal is on the order of several seconds, e.g., if the overboarding velocity V is 5 knots (2.5 m/s). This is adequate time for the node coupling device 504 to grasp the node 504 on the cable 502, compress the latch spring on the attachment mechanism to release the latch, allow the clamp to open under a bias force, remove the open clamp from around the cable 502, release the latch spring on the attachment mechanism, and deposit the node 510 away from the cable 502 for storage, charging, data download, cleaning, etc.

Once a node 510 has been removed from the cable 502 the forward pinion pulley 516 begins to move forward from an aft position along the lateral rack 518 and create a buffer length of cable 502 for continuous, constant velocity take up by the spool 512. The aft pinion pulley 524 begins to simultaneously move downward from the upper position on the vertical rack 526 to relinquish its buffer length of cable 502, which is thus transferred to the forward buffer system 506. With this movement, the forward and aft pinion pulleys 516, 524 ultimately return to their starting positions for node detachment during retrieval of the cable 502 such that the next node can pass by the aft pinion pulley 524 to be positioned in the node coupling device 504, at which point the cycle repeats. During retrieval, the cable 502 winds onto the spool 512 at a constant velocity V, which is the same as the take-up velocity of the cable 502 from the water column.

Figure 11A:
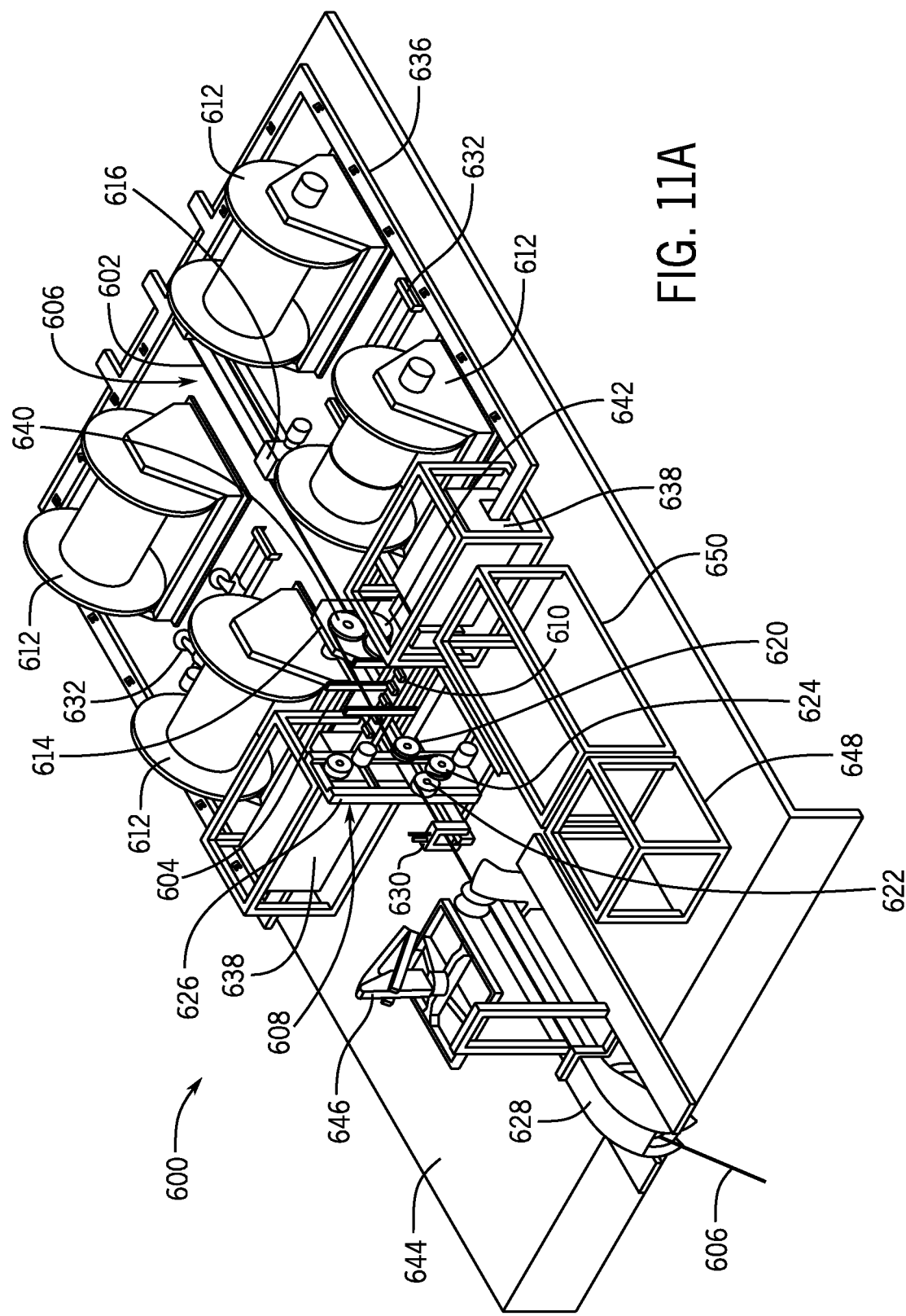
FIG. 11A is an isometric view of an embodiment of a system for seismic node deployment and retrieval that performs the functional steps of FIGS. 9A-10C.
Figure 11B:
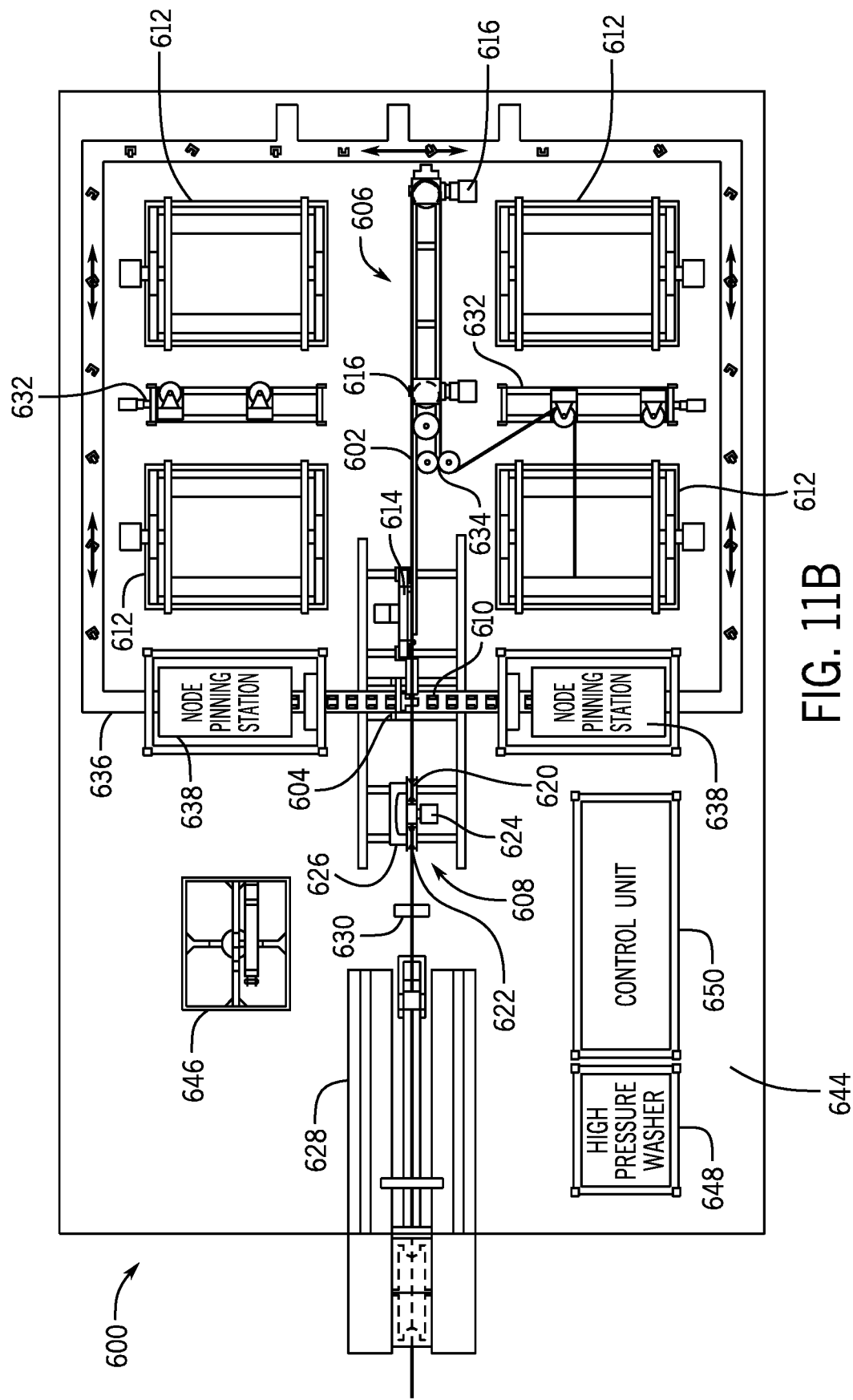
FIG. 11B is a top plan view of the system of FIG. 11A.

An exemplary implementation of a seismic node deployment system 600 according to the schematic diagrams in FIGS. 9A-10C is depicted on the back deck 644 of a marine vessel in FIGS. 11A-11B. The system 600 is configured to attach and detach a plurality of seismic receiver nodes 610 onto and from a cable 602 for deployment from and return to a marine vessel. The system 600 may include a forward buffer system 606 and an aft buffer system 608 for controlling the relative speed of the cable 602 with respect to a node coupling device 610. A number of cables 602 may be stored upon a number of spools 612 from which the cables 602 are payed out for deployment in the water column or wound around for storage when not in use. A cable tensioner 614 may be positioned between the forward buffer system 606 and the aft buffer system 608 in order to maintain appropriate tension on the cable 602 as it is payed out or hauled in. The node coupling device 604 may be positioned between the cable tensioner 614 and the aft buffer system 608.

As the cable 602 is unwound from storage on one of the spools 612, it may pass around a pulley on a spooling device 632 that aids in uncoiling and coiling the cable 602 on the spools 612. The spool 612 is typically driven by a motor and functions as a winch when both coiling and uncoiling the cable 602 from the spool 612 due to the significant mass of the cable 602 and the related moment generated while the spool 612 rotates. The pulley on the spooling device 632 travels laterally on a bar to follow the position of the cable 602 as it unwraps or wraps around the spool 612. The pulley on the spooling device 632 directs the cable 602 from between the spools 612 to the forward buffer system 606 where the cable 602 and is threaded around the forward pinion pulley 616. A number of additional fixed forward guide pulleys 634 may additionally be used to direct the cable 602 along the forward buffer system 606 to the forward pinion pulley 616. In one exemplary implementation, the lateral rack 618 may include a linear array of gear teeth along its length and the motor may turn a gear that interfaces with the linear gear teeth to move the forward pinion pulley 616 back and forth on the lateral rack 618.

After winding around the forward pinion pulley 616, the cable 502 then passes through the cable tensioner 614. The cable tensioner 614 may be composed of one or more pulleys about which the cable 602 is threaded and which are configured to provide appropriate tension on the cable 602 when deploying and retrieving the cable 602 from the water column. The pulleys may include a motor-driven tension drive pulley 640 and a number of tension guide pulleys 642. The tension drive pulley 640 may have transmission gearing in order to protect the forward pinion pulley 616 and the spool 612 from excessive force that may be placed on the cable 602 by the water column.

The cable 602 next passes through the node coupling device 604, which is configured to attach a plurality of sensor nodes 610 serially onto the cable 602, typically at fixed interval spacings (and to further detach the nodes 610 from the cable 602 in an opposite operation). The nodes 610 may be conveyed to the node coupling device 604 from storage areas on the marine vessel via a conveyor system 636. In some embodiments, the nodes 610 may be designed to separate into two separate components, for example, a battery/memory component and a sensor/clock component, that are uncoupled from each other for storage and maintenance. When using such a component node configuration, the system 600 may include pinning and unpinning stations 638 adjacent to the node coupling device 604 to couple the node components together before attachment of the nodes 610 to the cable 602 or to separate the node components after the nodes 610 are removed from the cable 602. In one exemplary embodiment, the node 610 may be equipped with a coupler that clamps the node 610 onto the cable 602. The node coupling device 604 may be configured to pick a node 610 from a provided supply of nodes 610, place the coupler adjacent to the cable 502, compress a latch spring to open a latch on the attachment mechanism, close a clamp of the coupler about the cable 502, and release the latch spring to close the latch and secure coupler about the cable 502 to connect the node 510 to the cable 502 to connect the node 610 to the cable 602.

After passing through the node coupling device 604, the cable 602 may be threaded through a number of pulleys forming the aft cable buffer 608. The first aft base pulley 620 and the second aft base pulley 622 may be located at fixed positions on lateral sides of the base of the vertical rack 626 along which the aft pinion pulley 624 moves. The aft pinion pulley 624 may be driven vertically along the vertical rack 626 by a motor that is under control of a control system 650. In one exemplary implementation, the vertical rack 626 may include a linear array of gear teeth along its length and the motor may turn a gear that interfaces with the linear gear teeth to move the aft pinion pulley 616 up and down on the vertical rack 626. The control system 650 may further control the forward buffer system 606, the spools 512, the cable tensioner 614, the node coupling device 6040, and other components of the system 600 in order to synchronize components and balance forces and loads on the system 600.

Other components of the system 600 mounted on the back deck 644 may include an overboarding unit 628, a pressure washer unit 648, and a deck crane 646. The overboarding unit 628 may include additional guide pulleys and provide a strong, structural framework for guiding the cable 602 over the stern of the marine vessel and into the water column. The pressure washer unit 648 may be used to clean salt water, mud, and debris from the nodes 610 and other components in order to maintain and extend the life of such components. The deck crane 646 may be used to move, assemble, or disassemble any of the components of the system 600 on the back deck 644.

Figure 12:
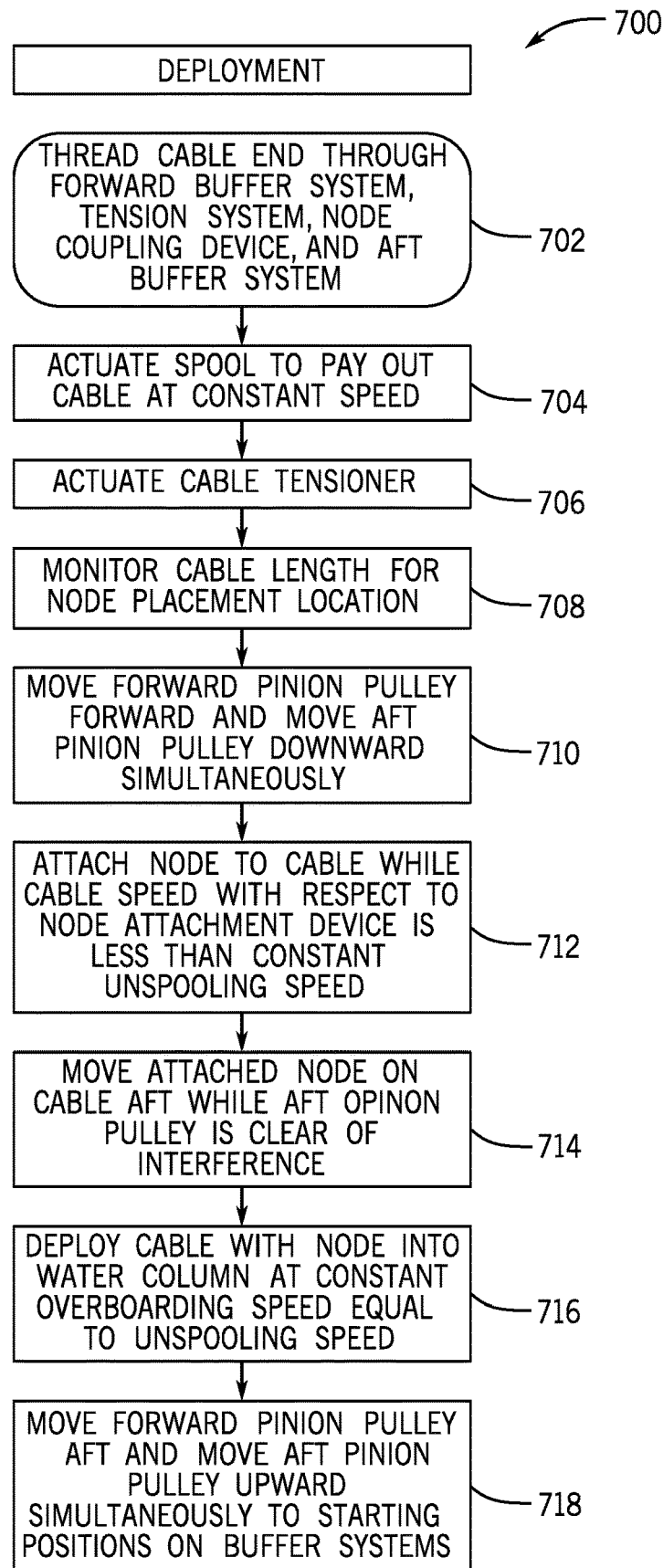
FIG. 12 is a flow diagram of operational steps performed by a control system controlling seismic node attachment and deployment according to FIGS. 9A-9D.

As indicated in the exemplary implementation depicted in FIGS. 11A and 11B, a control system is typically used to actuate and synchronize the various components of the seismic node deployment system. A flow diagram with exemplary node deployment operations 700 undertaken by a control system to coordinate such a seismic node deployment system is presented in FIG. 12. Initially, it is noted that the cable must be routed from storage on the spool through the forward buffer system, the tension system, the node coupling device, and the aft buffer system as indicated in starting configuration status 702. Once the cable is in place within the deployment system, the control system will actuate the motor on the spool to pay out the cable at a constant speed as indicated in operation 704. In conjunction, and in some instances simultaneously, the control system will actuate the motor of the driven pulley in the cable tensioner to place appropriate tension on the cable within the system as indicated in operation 706. After actuation of the spool and cable tensioner, the control system constantly monitors and adjusts the power to and effects gear changes in transmissions of the spool motor and cable tensioner motor in order to maintain proper tension on the cable and resist constantly changing forces on the cable, for example, forces of the moment of the cable mass as the spool rotates and forces from the water column dragging on cable length that is already deployed from the marine vessel.

The control system further monitors the length of cable payed out from the spool as indicated in operation 708 in order to identify the locations for node placement along the cable. Typically, the nodes will be and attached at equal separation distances along the cable. However, the control system can be programmed to attach the nodes to the cable at disparate separation distances as desired in order to meet any particular seismic recording requirements. When a node attachment location is determined to be in line with the node coupling device, the control system actuates the motors that move the forward and aft pinion pulleys on the racks. The forward pinion pulley is moved forward and the aft pinion pulley is moved downward simultaneously at substantially half the speed that the cable is payed out from the spool. By moving the forward and aft pinion pulleys in this manner to take up cable length on the forward end and pay out stored length on the aft end, the cable segment located at the node coupling device is substantially stationary or moves at a significantly reduced speed with respect to the node coupling device for the period that the forward and aft pinion pulleys traverse the racks.

During the period that the cable is stationary with respect to the node coupling device, the control system causes the node coupling device to attach the node to the cable as indicated in operation 712. The control system can control the time available for attachment of the nodes on the order of several seconds depending upon the length of the racks and the speed of the cable. This is adequate time for the node coupling device to pick a node from a supply, compress the spring clamp, place the open clamp around the cable, and release the spring clamp on the node to complete the attachment of the node to the cable. In some embodiments, for example, as shown in FIGS. 11A and 11B, the control system may further control and coordinate the conveyor system to deliver nodes to the node coupling device and position them for picking by the node coupling device.

The control system further monitors the position of the aft pinion pulley on the vertical rack to determine when its position is below the aft base pulleys and clear of the cable and attached node as indicated in operation 714. Once the aft pinion pulley reaches this bottom position, its movement is halted by the control system and the cable moves at a constant speed throughout the entire deployment system to pass the aft buffer system with the attached node and continue to the overboarding unit for deployment into the water column as indicated in operation 716. As noted, the speed of the cable is traveling through the deployment system is constant with respect to all components of the system at this point (i.e., the speed of the cable coming off the spool is the same as the speed of the cable with respect to the node coupling device, which is the same as the speed of the cable entering the water column).

After the node attached to the cable clears the aft buffer system, the control system actuates the motor on the forward pinion pulley to move it aft and the motor on the aft pinion pulley to move it upward as indicated in operation 718. In this manner, the forward and aft pinion pulleys return to their starting locations on the racks to prepare the deployment system to attach the next node.

Figure 13:
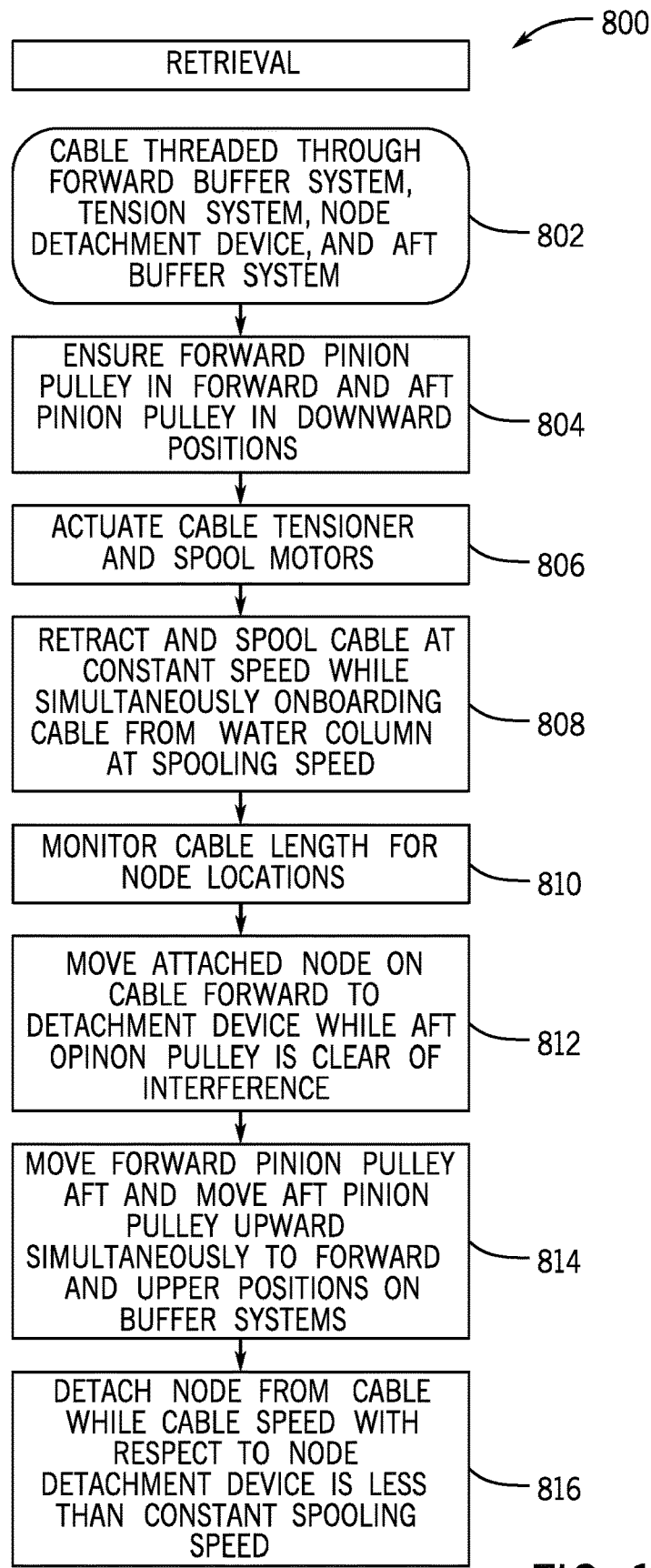
FIG. 13 is a flow diagram of operational steps performed by a control system controlling seismic node retrieval and detachment according to FIGS. 10A-10C.

FIG. 13 is a flow diagram depicting exemplary retrieval operations 800 undertaken by a control system to coordinate such retrieval of a seismic node deployment system from a water column. As with deployment, in order for the retrieval operation to begin, the cable must be attached to a spool and threaded through the forward buffer system, the tension system, the node coupling device, and the aft buffer system as indicated in starting configuration status 802.

The control system next determines whether the forward and aft pinion pulleys are in the proper starting positions for node retrieval and removal, which are the forward and downward positioned, respectively, as indicated in operation 804. If the forward and aft pinion pulleys are not is the proper positions, the control system actuates the motors that move the forward and aft pinion pulleys on the racks to the proper positions.

Once the cable is in place within the deployment system and the forward and aft pinion pulleys are in the proper starting positions, the control system will actuate the motor on the spool to coil the cable at a constant speed as indicated in operation 806. In conjunction, and in some instances simultaneously, the control system will actuate the motor of the driven pulley in the cable tensioner to place appropriate tension on the cable within the system as further indicated in operation 806. After actuation of the spool and cable tensioner, the control system constantly monitors and adjusts the power to and effects gear changes in transmissions of the spool motor and cable tensioner motor in order to maintain proper tension on the cable and resist constantly changing forces on the cable, for example, forces of the moment of the cable mass as the spool rotates and acquires more cable mass and forces from the water column dragging on changing cable length that is in the water column.

The control system further maintains a constant speed of the spool for retraction of the cable from the water column at the same constant speed as indicated in operation 808. The control system may further coordinate the rotational speed of the driven pulley in the tensioner system to draw the cable through the tensioner system at the same speed of coiling on the spool. While the cable is coiled, the control system further monitors the length of cable retrieved from the water column as indicated in operation 708 in order to identify the locations of the nodes for positioning within the node coupling device for node removal from the cable. Typically, the nodes will be and attached at equal separation distances along the cable. However, the nodes may be attached to the cable at disparate separation distances as desired in order to meet any particular seismic recording requirements. In addition to, or as an alternative to, monitoring the cable length, the control system may merely monitor for the presence and location of a node as it passes through the components of the deployment system on the back deck.

The control system specifically determines when a node has passed the aft buffer system and is in line with the node coupling device as indicated in operation 812. At this point, the forward pinion pulley is moved aft and the aft pinion pulley is moved upward simultaneously at substantially half the coiling speed of the cable onto the spool as indicated in operation 814. By moving the forward and aft pinion pulleys in this manner to take up cable length on the aft end and pay out stored length on the forward end, the cable segment with the attached node located at the node coupling device is substantially stationary or moves at a significantly reduced speed with respect to the node coupling device for the period that the forward and aft pinion pulleys traverse the racks.

By effectively halting the movement of the cable through the node coupling device, the node can be easily detached from the cable as indicated in operation 816 during the time it takes the forward and aft pinion pulleys to traverse lengths of the lateral and vertical racks, respectively. Typically the time for such traversal is on the order of several seconds. This is adequate time for the node coupling device to grasp the node on the cable, compress the spring clamp, remove the open clamp from around the cable, release the spring clamp on the node, and deposit the node for storage or maintenance activities. Once the forward and aft pinion pulleys reach their terminal aft and upward positions, respectively, the control system returns them to their starting positions to await the next node while the cable continues to be reeled in from the water column and stored on the spool at a constant speed.

Figure 14:
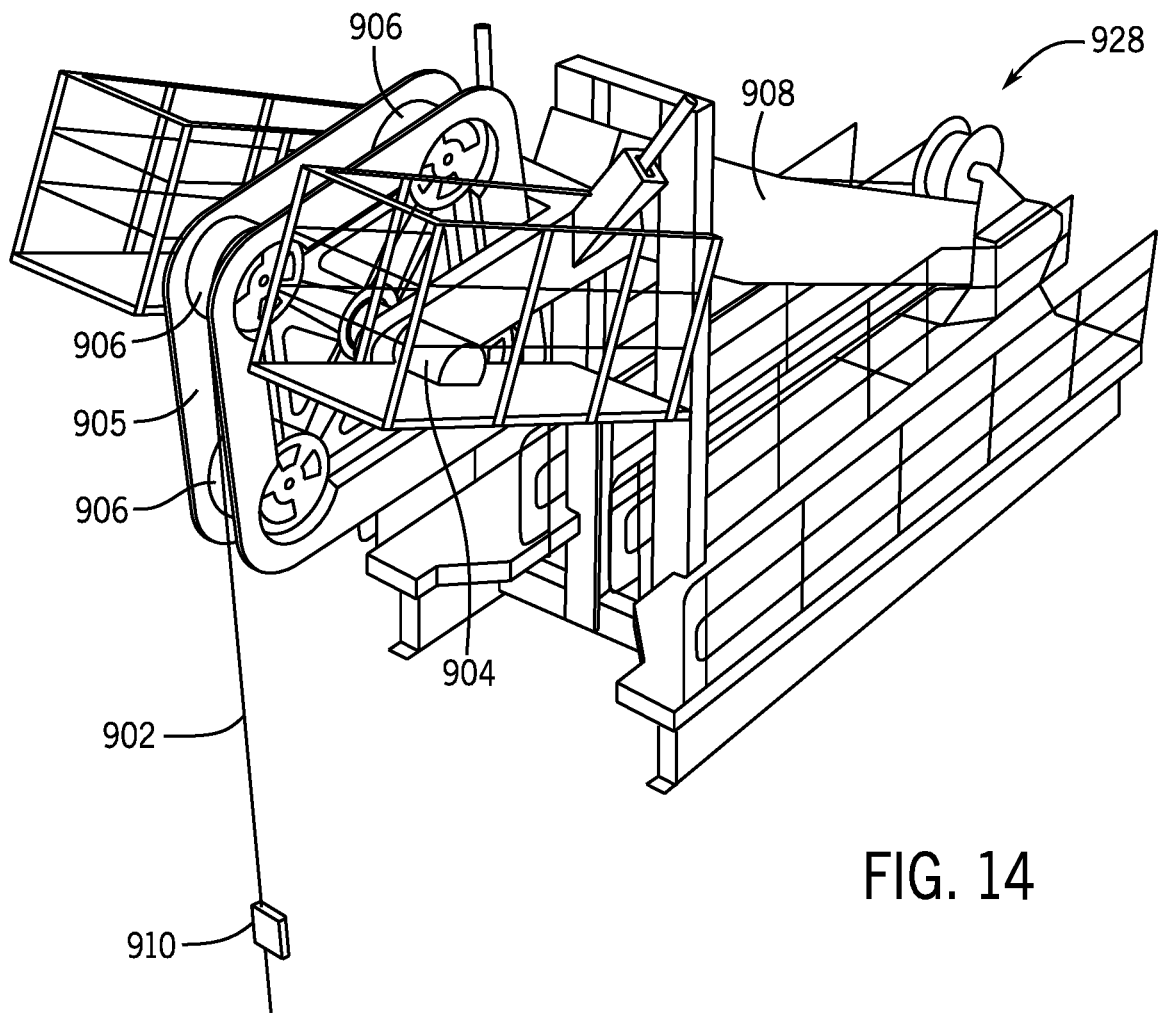
FIG. 14 is an isometric view of a square wheel overboarding system.
Figure 16:
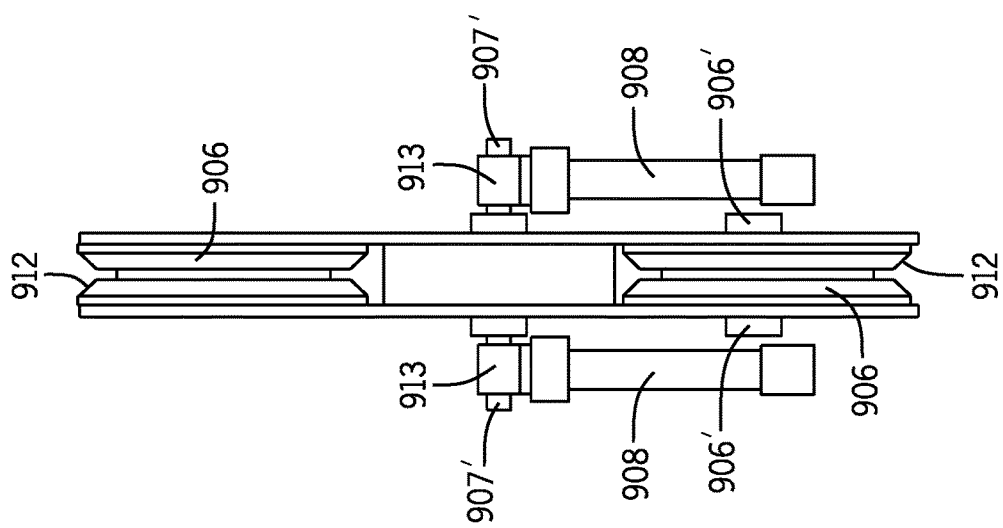
FIG. 16 is a rear end view of the overboarding system of FIG. 14.
Figure 15:
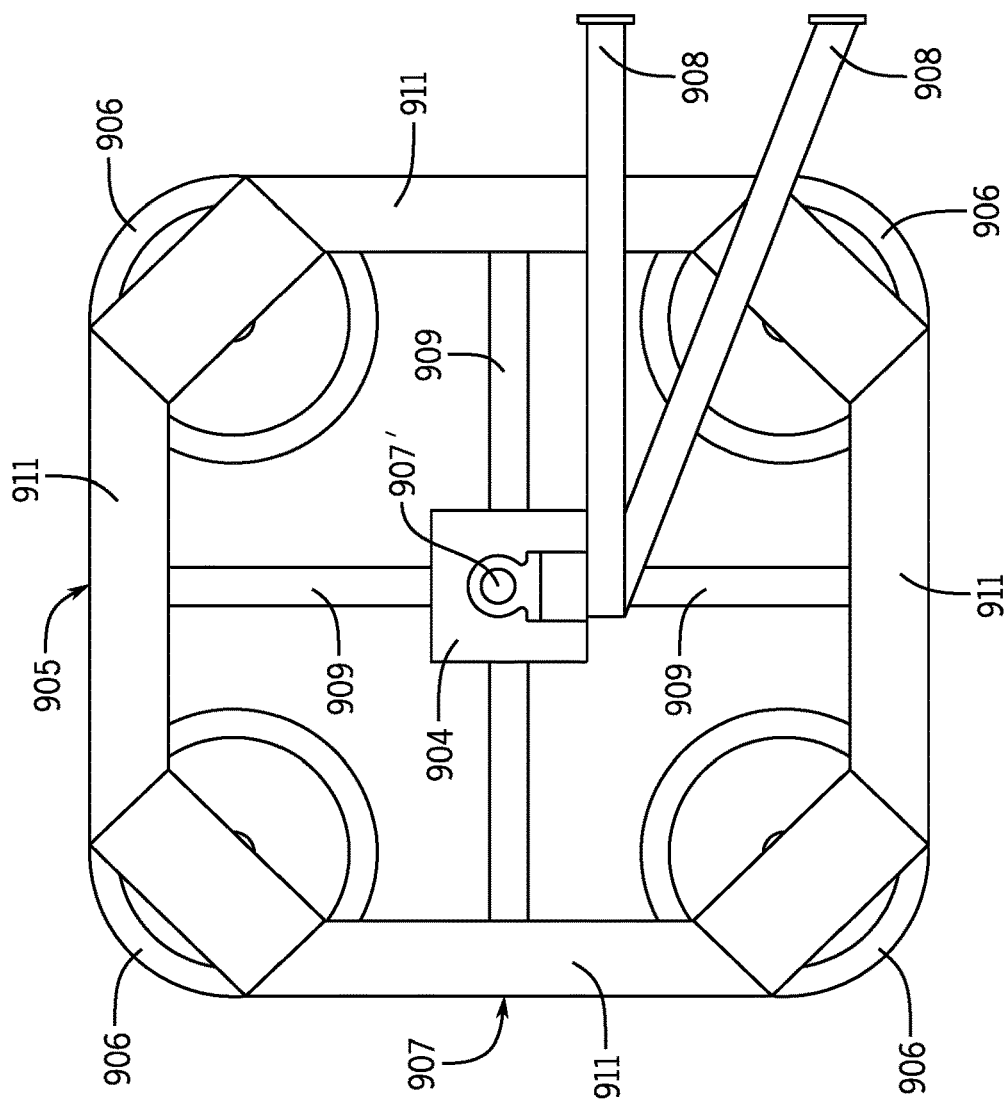
FIG. 15 is a side elevation, schematic view of the overboarding system of FIG. 14.

FIGS. 14-16 depict an exemplary embodiment of an overboard unit 928 positioned at the stern of the marine vessel for paying cable 902 with attached nodes 910 into the water and retrieving the cable 902 with attached nodes 910 from the water without damaging the nodes 910. The overboard unit 928 may include two or more rotary sheaves 906 and a rotary support frame 907 for carrying the sheaves 906. The term "sheave" as used herein refers to a pulley or wheel or roller with a groove along its edge for guiding a cable while changing the running direction of the cable. In the embodiment depicted in the figures, the support frame 907 is substantially square in shape and four rotary sheaves 906 are attached at respective corners of the support frame 907 as further described below. The sheaves 906 are spaced from each other a distance that is greater than a length of the nodes 910 to permit the cable 902 with the attached node 910 to be positioned between and extend in a straight line between two adjacent sheaves 906. Each sheave may have a rotational axis 906' that is parallel to a rotational axis 907' of the support frame 907. A bracket or arm 908 is mounted to the stern of the marine vessel for carrying the rotary support frame 907. The sheaves 906 are configured on the support frame 907 to have an effective radius of curvature that is larger than a minimum permissible bend radius of the cable 902 in order to prevent damage to the cable 902 during deployment and retrieval.

The support frame 907 is rotary at least between a first position in which the node 910 along a length of the cable 902 has a generally horizontal orientation and is supported by the two sheaves 906, and a second position in which the node 910 with the associated length of the cable 902 on each side of the node 910 extending to the sheaves 906 has a generally vertical orientation. In one embodiment, during deployment of the cable 902, the support frame 907 may actually start rotating before a node 910 reaches a sheave 906 in order to prevent the node 910 from impacting the sheave 906. In such an implementation, the node 910 will be positioned between two sheaves 906 as the side of the support frame 907 receiving the node 910 is on an angularly upward trajectory and before the side of the support frame 907 with the node 910 reaches a horizontal position. During the rotation of the support frame 907, the node 910 does not move in relation to the two sheaves 906 that the node 910 is positioned between and the node 910 is continuously supported by the sheaves 906.

In a simple embodiment, not shown, the support frame 907 may be a straight arm. Two sheaves 906 may be located at opposing ends of the arm and the arm can rotate around its center. The bracket 908 will project rearward from the stern of the marine vessel to permit the arm to rotate at least a quarter of a full turn from a generally horizontal or slightly inclined orientation to a generally vertical one, or the other way around. After having made the quarter of a full turn and delivered the straight section of cable 902 with an attached node 910, the arm may swing back to its original position for receiving the next straight section of cable 902 and repeating the action. In another embodiment, instead of being straight, the arm may be angular, and the two halves of the arm may form a straight angle, for example, between them.

In the embodiment shown in FIGS. 14-16, the support frame 907 has four sheaves 906 located at the corners of a square. As shown, the support frame 907 has four spokes 909 extending between a hub 904 and a surrounding generally square frame 911. The corners of the square support frame 907 may be beveled to give the support frame 907 an octagonal shape and the four rotary sheaves 906 are mounted at the beveled corners. As shown in FIG. 16, the sheaves 906 are provided with a circumferential groove 912 fitting the cable 902 that engages the sheaves 906. In an alternative embodiment, not shown, two identical arms having rotary sheaves 906 at their ends may cross each other perpendicularly to form a substantially square rotary support frame having the sheaves 906 located in the corners of the square. The two arms may be interconnected by struts in order to increase stability. In all of the embodiments described above, the sheaves 906 are preferably equidistantly spaced from the rotational axis 907' of the rotary frame 907 and equiangularly spaced from one another. In this design, all rotations of the support frame 907 (e.g., a quarter of a full turn or slightly more) will be in the same direction and without full rotation back to an immediate previous position. The rotary support frame 907 may be mounted in bearings 913 in the hub 904 carried by a forked end of the bracket 908. In such a configuration, the bracket 908 may not need to project rearward from the stern of the marine vessel for adequate clearance.

As disclosed above, the support frame 907 can rotate around its own center on the bearings 913, and the sheaves 906 at the corners of the frame 907 can rotate freely. A locking system may also be employed to keep the support frame 907 from rotating when it should not. The locking system may be a purely mechanical device, or it can be an electrical or hydraulic system.

Figure 17A:
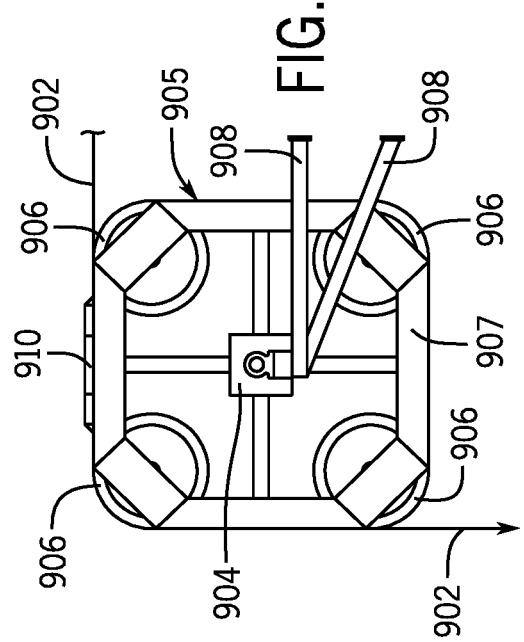
FIGS. 17A-17D are a sequence of side elevation views of the overboarding system of FIG. 14 in operation with a node connected to a cable and passing through the overboarding system.

FIGS. 17A-17D depict a sequence of side views of the overboard unit 928 in operation. When the cable 902, without any attached nodes 910, is paid out, the cable 902 passes over the overboard unit 928 as shown in FIG. 17A. The cable 902 pays out over the upper left sheave 906, which rotates while the support frame 907 is prevented from rotating by the locking system. Only the small friction force between the cable 902 and the sheave 906 will assert any rotational force on the support frame 907; all other forces are balanced and the force needed to keep the support frame 907 from rotating is small.

Figure 17B:
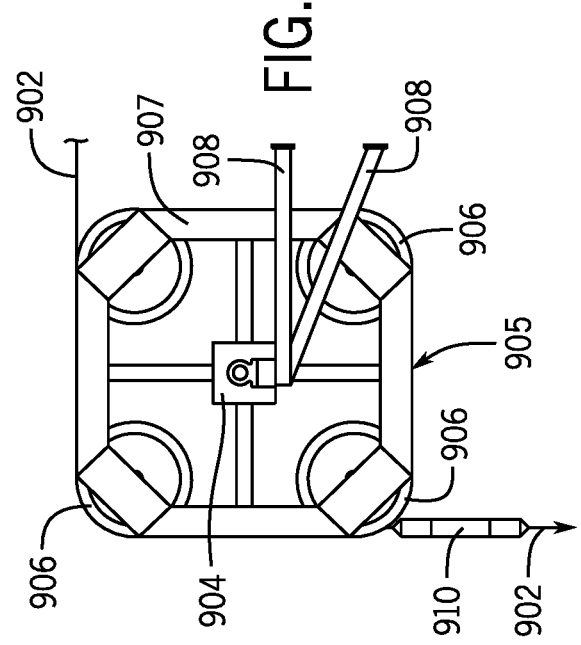
Figure 17C:
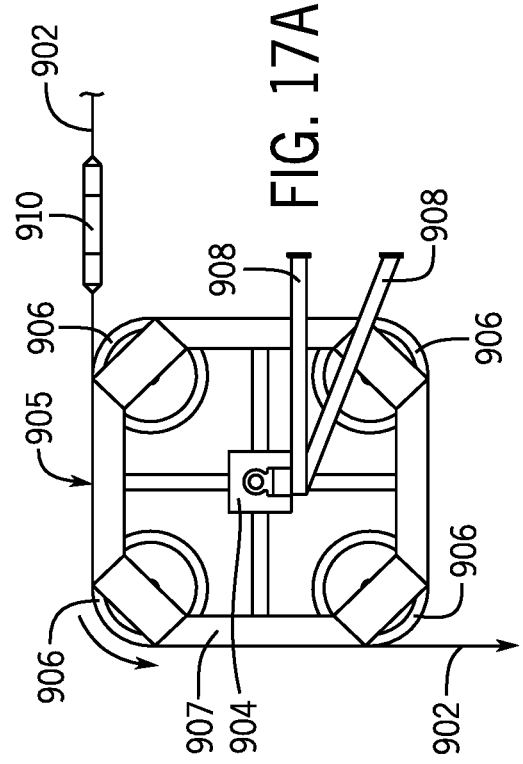

When a stiff node 910 reaches the overboard unit 928, it will reach a position halfway between the two upper sheaves 906, as shown in FIG. 17B. At this point the locking system is released, and the support frame 907 can rotate freely with no relative movement between the node 910 and the support frame 907. In other embodiments the support frame 907 may have a start position at a slight inclination such that the node 910 is actually received and positioned between the upper and lower right sheaves 906 and then the support frame 907 begins to rotate. In this manner, the node 910 will not impact any of the sheaves 906 as the cable is payed out over the overboard unit 928. With this configuration, the support frame 907 rotates with the cable 902 and the node 910 is protected from any bending or other stress forces as shown in FIG. 17C.

Figure 17D:
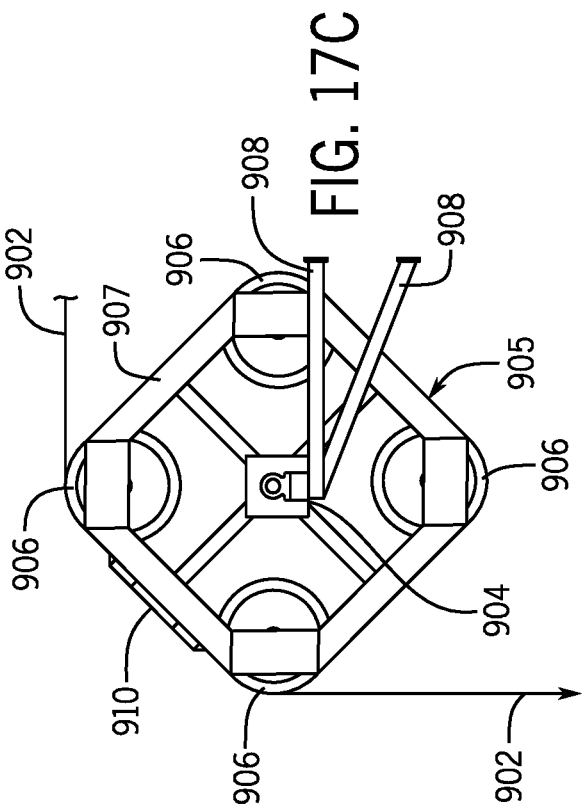

When the support frame 907 has rotated about a quarter or between a quarter and a half of a full turn, the locking system is engaged again, preventing the support frame 907 from rotating any more. The cable 902 now can continue rolling over the upper left-hand sheave 906 as shown in FIG. 17D until the next node 906 arrives at the overboard unit 928. When time to retrieve the cable 902 with attached nodes 910, the onboarding unit 928 is operated in the opposite rotational direction to ensure that the nodes 910 fall between the sheaves 906 to prevent damage to the nodes 910.

Figure 18:
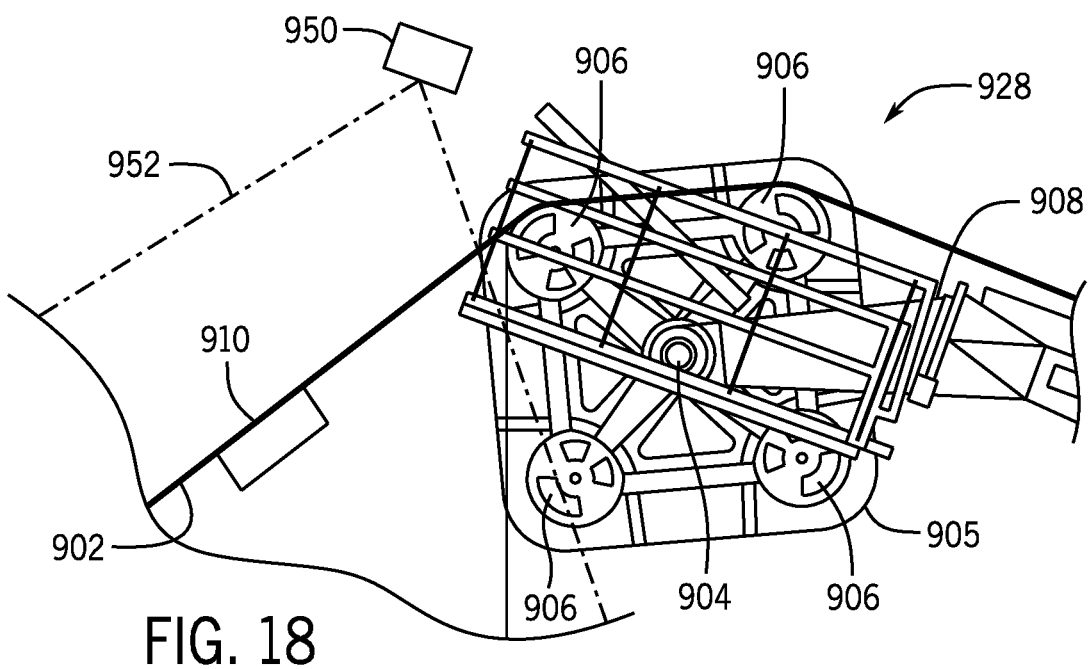
FIG. 18 is a schematic diagram of a square wheel onboarding system of FIG. 14 operating in conjunction with an embodiment of a node presence detection system.

An alternate embodiment of the overboarding unit 928 is depicted in FIG. 18. In this embodiment, the overboarding unit 928 is paired with a position sensing device 950 positioned at the stern of the marine vessel and oriented with a field of view 952 to capture the nodes 910 as they emerge from the water and approach the overboarding unit 928 functioning in an onboarding mode. The purpose of positional sensing of the nodes 910 by the position sensing device 950 is to accurately determine the position of the node 910 and, more importantly, the distance of the node 910 from the top rear sheave 906 of the overboarding unit 928. When the position information from the position sensing device 950 indicates that the node 910 is in the appropriate threshold position, the position sensing device 950 can send a control signal to the overboarding unit 928 to engage a motor that drives the hub 904 or to release a lock on the bearing 913 to begin rotation of the support frame 907 on the bearing 913, By this sensing and control action, the node 910 will be positioned between the upper and lower rear sheaves 906 as shown in FIG. 18 when the support frame 907 begins rotating. Further, while the support frame 907 rotates, the nodes 910 will remain stationary with reference to the sheaves 906 on the support frame 907 until the node passes the position of the upper forward sheave 906 as shown in FIG. 18. In this manner, the nodes 910 will not be pulled over or otherwise impact the sheaves 906 and thus, the likelihood of damage to the nodes 910 due to contact with the overboarding unit 928 during cable 902 and node 910 retrieval is minimized.

In some embodiments the position sensing device 950 may be a stereoscopic camera with a three-dimensional field of view. The ability to perceive depth with such a camera arrangement provides for more precise measurement of position of the nodes 910 with respect to other structures. For example, some stereoscopic cameras have measurement precision to within 5 cm at up to 3 m distance of the camera from the object in the field of view. In other embodiments, the position sensing device 950 may be a standard camera or video camera used in conjunction with a control system that can analyze images of the node 910 with respect to one or more known reference marks within the field of view 952. The control system can interpret the position of the node 910 with respect to the reference marks to calculate a precise position of the nodes 910 and provide appropriate control triggers to the overboarding unit 928. In yet other embodiments, a laser curtain generator could be used as the position sensing device 950 and reflections from a node 910 with a field of the laser curtain can be received and interpolated through calculation into precise positional measurements of the node 910 for triggering the rotation of the support frame 907 in the overboarding unit 928. Other measurement systems for identifying the location of the node 910 within a field of view 952, for example, a proximity sensor or a motion sensor, may also be integrated with a control system for the overboarding unit 928 to provide appropriate control commands to the overboarding unit 928 during onboarding of the cable 902.

All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the structures disclosed herein, and do not create limitations, particularly as to the position, orientation, or use of such structures. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order and relative sizes reflected in the drawings attached hereto may vary.

The above specification, examples and data provide a complete description of the structure and use of exemplary embodiments of the invention as defined in the claims. Although various embodiments of the claimed invention have been described above with a certain degree of particularity, or with reference to one or more individual embodiments, those skilled in the art could make numerous alterations to the disclosed embodiments without departing from the spirit or scope of the claimed invention. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

What is claimed is:

1. An attachment system for releasably attaching a sensor node to a cable, the attachment system comprising:
   a clamp base fixed to a surface of the sensor node, wherein the clamp base further comprises a latch that is biased in a same position when the attachment system is in both a coupled state and an uncoupled state; and
   a clamp grip pivotably attached to the clamp base and biased in an open position when the attachment system is in the uncoupled state,
   wherein the clamp grip is secured to the clamp base by the latch when the attachment system is in the coupled state.

2. The attachment system of claim 1, further comprising a channel disposed between the clamp base and the clamp grip within which the cable is positioned when the attachment system is attached to the cable.

3. The attachment system of claim 2, wherein a first portion of the channel is defined within the clamp grip and a second portion of the channel is defined within the clamp base.

4. The attachment system of claim 3, wherein a plurality of raised ribs extend from a surface of the first portion of the channel, a surface of the second portion of the channel, or both.

5. The attachment system of claim 1, wherein
   the clamp base further comprises a first set of hinge knuckles formed thereon;
   the clamp grip further comprises a second set of hinge knuckles formed thereon and configured to pivotably interface with the first set of hinge knuckles; and a hinged pin is positioned between and within the first and second sets of hinge knuckles to form a hinged attachment between the clamp base and the clamp grip.

6. The attachment system of claim 1, wherein the clamp grip further comprises a plurality of latch fingers which are secured to the clamp base by the latch when the attachment system is in the coupled state.

7. The attachment system of claim 6, wherein the latch further comprises a latch pin with a plurality of latch plates separated by a plurality of keyways, wherein the latch fingers are configured to fit within the keyways when the latch is forced into an open position by a first external force and further when the clamp grip is forced into a closed position by a second external force when the attachment system is in the uncoupled state; and the latch fingers are retained within the latch by the latch plates to maintain the clamp grip in the closed position when the first and second external forces are removed such that the latch returns to the same position.

8. A seismic sensor node apparatus comprising:

a cable configured for deployment to a seismic medium; and a plurality of seismic sensor nodes coupled to the cable, wherein each sensor node comprises a seismic sensor disposed within a housing and configured to generate signals responsive to seismic energy propagating in the seismic medium; and a coupling mechanism fixed to an exterior of the housing for removably coupling the housing to the cable, wherein the coupling mechanism comprises a clamp configured to grip the cable in a coupled state and biased in an open position in an uncoupled state; and a latch configured to secure the clamp in the coupled state and is biased in a same position both when the clamp is secured in the coupled couple state and when the clamp is biased in the open position in the uncoupled state.

9. The seismic sensor node apparatus of claim 8 further comprising a channel disposed within the coupling mechanism within which the cable is positioned when the coupling mechanism is attached to the cable.

10. The seismic sensor node apparatus of claim 9, wherein a first portion of the channel is defined within a first portion of the clamp and a second portion of the channel is defined within a second portion of the clamp.

11. The seismic sensor node apparatus of claim 10, wherein a plurality of raised ribs extend from a surface of the first portion of the channel, a surface of the second portion of the channel, or both.

12. The seismic sensor node apparatus of claim 8, wherein the clamp further comprises a first set of hinge knuckles formed in a first portion of the clamp;

a second set of hinge knuckles formed in a second portion of the clamp and configured to pivotably interface with the first set of hinge knuckles; and a hinge pin positioned between and within the first and second sets of hinge knuckles to form a hinged attachment between the first portion of the clamp and the second portion of the clamp.

13. The seismic sensor node apparatus of claim 12, wherein the second portion of the clamp further comprises a plurality of latch fingers which are secured to the first portion of the clamp by the latch when the coupling mechanism is in the coupled state.

14. The seismic sensor node apparatus of claim 13, wherein the latch further comprises a latch pin defining a plurality of latch plates separated by a plurality of keyways;

the latch fingers are configured to fit within the keyways when the latch is forced into an open position by a first external force and further when the clamp is forced into a closed position by a second external force when the coupling mechanism is in the uncoupled state; and the latch fingers are retained within the latch by the latch plates to maintain the clamp in the closed position when the first and second external forces are removed such that the latch returns to the same position.

* * * * *